(12) United States Patent
Vandenbussche et al.

(10) Patent No.: US 10,793,433 B2
(45) Date of Patent: Oct. 6, 2020

(54) PROCESS FOR PRODUCING HYDROGEN PEROXIDE

(71) Applicant: SOLVAY SA, Brussels (BE)

(72) Inventors: Alain Vandenbussche, Brussels (BE); Patrick Markus Dhaese, Curitiba (BR); Stephen Bloomfield, Tervuren (BE); Francine Janssens, Vilvoorde (BE)

(73) Assignee: Solvay SA, Brussels (BE)

( * ) Notice: Subject to any disclaimer, the term of this patent is extended or adjusted under 35 U.S.C. 154(b) by 0 days.

(21) Appl. No.: 14/350,820

(22) PCT Filed: Oct. 2, 2012

(86) PCT No.: PCT/EP2012/069408
§ 371 (c)(1),
(2) Date: Apr. 10, 2014

(87) PCT Pub. No.: WO2013/053616
PCT Pub. Date: Apr. 18, 2013

(65) Prior Publication Data
US 2014/0255294 A1 Sep. 11, 2014

(30) Foreign Application Priority Data
Oct. 11, 2011 (EP) .................................. 11184575

(51) Int. Cl.
*C01B 15/023* (2006.01)
(52) U.S. Cl.
CPC .................................. *C01B 15/023* (2013.01)
(58) Field of Classification Search
CPC .................................................... C01B 15/023
See application file for complete search history.

(56) References Cited

U.S. PATENT DOCUMENTS

| | | | |
|---|---|---|---|
| 2,158,525 A | 5/1939 | Riedl et al. | |
| 2,215,883 A | 9/1940 | Riedl et al. | |
| 2,739,875 A * | 3/1956 | Sprauer | C01B 15/023 423/590 |
| 4,061,598 A | 12/1977 | Makar | |
| 4,428,922 A | 1/1984 | Hopkins | |
| 5,662,878 A * | 9/1997 | Datta | C01B 15/013 210/640 |
| 6,306,359 B1 | 10/2001 | Mathieu et al. | |
| 9,617,153 B2 | 4/2017 | Vandenbussche et al. | |
| 2005/0265915 A1 * | 12/2005 | Tonkovich | B01J 19/0093 423/584 |
| 2008/0226541 A1 * | 9/2008 | Zhou | C01B 15/023 423/588 |

FOREIGN PATENT DOCUMENTS

| | | |
|---|---|---|
| EP | 0726227 A1 | 8/1996 |
| EP | 1118457 A1 | 7/2001 |
| JP | 35004121 B | 4/1960 |
| JP | 2002091552 A * | 3/2002 |
| WO | WO 199815350 A2 | 4/1998 |
| WO | WO 199940024 A1 | 8/1999 |
| WO | WO 2010069896 A1 | 6/2010 |
| WO | WO 200109011 A1 | 9/2010 |
| WO | WO 2013053617 A1 | 4/2013 |
| WO | WO 2013/135491 A1 | 9/2013 |

OTHER PUBLICATIONS

U.S. Appl. No. 14/384,559, Stephen Bloomfield et al.
Balasubramanian, K. et al.—"Remote Control Techniques for Selected Applications Performed through Internet" International Conference on Control Automation, Communication and Energy Conservation (2009), XP002665408—6 pages.
Ng, K. M. et al.—"Trickle-Bed Reactors" Special Report, Chemical Engineering Progress (1987) pp. 55-63—8 pages.
U.S. Appl. No. 14/350,825, Alain Vandenbussche et al.

* cited by examiner

*Primary Examiner* — Melissa S Swain
(74) *Attorney, Agent, or Firm* — Osha Liang LLP

(57) ABSTRACT

A process for manufacturing hydrogen peroxide by an anthraquinone autoxidation process (AO-process) comprising two alternate (essential) steps of: (a) hydrogenation of a working solution in a hydrogenation unit in the presence of a catalyst, wherein such working solution contains at least one alkylanthraquinone dissolved in at least one organic solvent, to obtain at least one corresponding alkylanthrahydroquinone compound; and (b) oxidation of the at least one alkylanthrahydroquinone compound to obtain hydrogen peroxide in an oxidation unit; and further comprising the step of: (c) extracting the hydrogen peroxide formed in the oxidation step in an extraction unit, wherein the units of step (a) to (c), optionally together with further ancillary units as appropriate, constitute a hydrogen peroxide production site, wherein one or more of said units are equipped with one or more sensors for monitoring one or more AO-process parameters at the hydrogen peroxide production site, said sensors being interconnected with one or more first computers at the hydrogen peroxide production site, said first computers being linked via a communication network to one or more second computers in a control room being remote from the hydrogen peroxide production site, and said control room being remotely controlling such hydrogen peroxide production site.

17 Claims, No Drawings

PROCESS FOR PRODUCING HYDROGEN PEROXIDE

This application is a U.S. national stage entry under 35 U.S.C. § 371 of International Application No. PCT/EP2012/069408 filed Oct. 2, 2012, which claims priority to European application No. 11184575.6 filed on Oct. 11, 2011, the whole content of this application being incorporated herein by reference for all purposes.

Should the disclosure of any patents, patent applications, and publications which are incorporated herein by reference conflict with the description of the present application to the extent that it may render a term unclear, the present description shall take precedence.

TECHNICAL FIELD OF THE INVENTION

The present invention relates to a process for producing hydrogen peroxide, particularly for producing aqueous hydrogen peroxide solutions for direct use in an industrial application, a device for carrying out such a process.

BACKGROUND OF THE INVENTION

The production of hydrogen peroxide as such is well known. Hydrogen peroxide can be produced by various methods, e.g., by direct hydrogenation of oxygen or more commonly by the so-called anthraquinone autoxidation process (AO-process). The present invention particularly relates to the more industrially common AO-process.

Hydrogen peroxide is one of the most important inorganic chemicals to be produced worldwide. The world production of hydrogen peroxide grew to 3.2 million metric tons (100% $H_2O_2$) in 2009. Its industrial application includes textile, pulp and paper bleaching, paper recycling, organic synthesis (propylene oxide), the manufacture of inorganic chemicals and detergents, environmental and other applications. In the context of the present invention the industrial application pulp and paper bleaching, mining or environmental applications are of particular interest.

Hydrogen peroxide production is performed by a few chemical companies that produce it in large scale plants as an up to 50-70 percent concentrate in water (% by weight). Because of the highly oxidative characteristics of that level of concentration hydrogen peroxide usually is adjusted to a 50 percent concentration for safe handling and transport, and 70 percent concentrates normally are used only for transport over large distance due to cost reasons. For safety reasons the hydrogen peroxide product is normally diluted to at least 50% before application, but for most applications it will be applied in a concentration of below 15%, In order to minimize operations, the dilution to the effective concentration normally occurs within the application itself by adding the appropriate amount of a higher concentrated solution of usually not more that 50% hydrogen peroxide. Ultimately, hydrogen peroxide is used in various concentrations depending on the application, e.g., in a variety of applications hydrogen peroxide is used in a concentration of approximately 1-15 percent. Some particular examples of such hydrogen peroxide concentrations are, depending on the kind of industrial application: pulp bleaching 2-10%; waste water oxidation 1-5%; consumer products surface cleaning 1-8%. In other applications such as disinfection the hydrogen peroxide concentration may be higher, e.g., in aseptic packaging typical concentrations may be 35% or 25%.

Industrial synthesis of hydrogen peroxide is predominantly achieved by using the Riedel-Pfleiderer process (originally disclosed in U.S. Pat. Nos. 2,158,525 and 2,215,883). This well-known large scale cyclic production process of hydrogen peroxide makes use of the autoxidation of a 2-alkylanthrahydroquinone compound to the corresponding 2-alkylanthraquinone which results in the formation of hydrogen peroxide.

Thus, hydrogen peroxide is typically produced using a two-stage cyclical anthraquinone process (AO-process) comprising the hydrogenation of anthraquinone working solution in a catalytic reactor and the oxidation of the hydrogenated anthraquinone working solution by air in a multi-stage packed bed or sieve plate tower while simultaneously producing hydrogen peroxide in the organic stream, with consecutive extraction of the hydrogen peroxide from the anthraquinone working solution by water in a multistage counter-current extraction column process. The organic solvent of choice is typically a mixture of two types of solvents, one being a good solvent of the quinone derivative (usually a mixture of aromatic compounds) and the other being a good solvent of the hydroxyquinone derivative (usually a long chain alcohol or cyclic ester). Next to said main AO-process steps, there may be other ancillary process steps involved, such like the separation of the hydrogenation catalyst from the working solution; the recovery and polish purification of the anthraquinone working solution, the accompanying solvents, and their recycle to the hydrogenator; and the recovery, polish purification and stabilization of the hydrogen peroxide product.

This AO-process utilizes alkylanthraquinone compounds, such as 2-ethylanthraquinone, 2-amylanthraquinone, and their 5,6,7,8-tetrahydro derivatives as the working compounds dissolved in a suitable organic solvent or mixture of organic solvents. These solutions of alkylanthraquinones are referred to as working solutions. In the first stage of the anthraquinone process (hydrogenation step), the working solution is subjected to hydrogenation in order to reduce the working compounds to their hydrogenated form, the alkylhydroanthraquinones. The hydrogenation of the working compounds is accomplished by mixing hydrogen gas with the working solution and contacting the resulting solution with an appropriate hydrogenation catalyst. In the second stage of the two-stage AO-process (oxidation step), the hydrogenated working compounds, i.e., the alkylhydroanthraquinones, are oxidized using oxygen, air, or a suitable oxygen containing compound in order to produce hydrogen peroxide and restore the working compound to its original form. The hydrogen peroxide produced in the oxidation step is then removed from the working solution, typically by extraction with water, and the remaining working solution containing the alkylanthraquinones is recycled to the hydrogenation step to again commence the process. The hydrogenation step may be carried out in the presence of a fluid-bed catalyst or a fixed-bed catalyst. Either method is known to have its particular advantages and disadvantages.

In a fluid-bed hydrogenation reactor, good contact between the three phases therein is obtained and thus the productivity and selectivity are generally high. However, the catalyst particles can be broken down by abrasion and can block the filters needed to separate the suspended catalyst and the hydrogenated working solution. This kind of reactor is also subject to back mixing. So, the use of suspended catalyst frequently requires the use of a larger hydrogenation reactor and expensive filtration sector to obtain a fully hydrogenated form.

In the fixed-bed hydrogenation reactor the catalyst does not abrade as much as the fluid-bed reactor and, if operated in a concurrent flow, does not result in back-mixing. But the reaction rate of a fixed-bed hydrogenation reactor is limited by the relatively slow rate of dissolution of hydrogen from the gas phase into the working solution, and also by the proportionally lower Pd surface per unit weight of a fixed bed versus a fluid bed catalyst. Therefore, to dissolve the required quantity of hydrogen necessary to thoroughly reduce all of the working compounds, the working solution has normally to be recycled several times. Thus, a very large recycle stream and a correspondingly large hydrogenation reactor are required, and thus adding to the capital costs of the process. In addition, the recycling of the hydrogenated solution results in over-hydrogenation of the working compounds so that they are ineffective in the overall process.

A special kind of fixed-bed reactors are the so-called trickle-bed reactors which are generally known in the literature (see e.g. NG K. M. and CHU C. F. Chemical Engineering Progress, 1987, 83 (11), p. 55-63). Although the trickle-bed reactors are primarily used in the petroleum industry for hydrocracking, hydrodesulfurization, and hydrodenitrogenation, and in the petrochemical industry for hydrogenation and oxidation of organic compounds, nevertheless, the trickle-bed hydrogenation reactor is also found in some versions of the AO-process for the manufacture of hydrogen peroxide. The term trickle-bed is used here to mean a reactor in which a liquid phase and a gaseous phase flow concurrently downward through a fixed bed of catalyst particles while the reaction takes place. Current practice in operating the trickle-bed reactor still relies mainly on empirical correlations and obviously parameters such like pressure drop, dispersion coefficients, and heat and mass transfer coefficients depend on both, gas and liquid flow rates. From the literature it is also known to operate trickle-bed reactors under different flow patterns such like "trickling", "pulsing", "spray", "bubble" and "dispersed bubble". One of the major problems in the use of the trickle-bed, especially in the trickle-flow regime, is the possibility of channeling in the fixed-bed hydrogenation reactor.

In Chemical Abstracts no. 19167 f-h, volume 55 (Japanese patent no. 60 4121) the manufacture of hydrogen peroxide is described, in which process a mixture of an alkylanthraquinone solution with great excess of hydrogen or hydrogen containing gas is foamed by passing this mixture through a porous diffuser in the upper part of a column containing a granular hydrogenation catalyst. The foamed mixture is then passed rapidly through the catalyst layer to hydrogenate. At the bottom of the column a bed consisting of glass wool, rock wool, a metal screen, or a filter cloth is placed for defoaming, and the defoamed working solution is withdrawn from the bottom and the great excess of separated gas is recycled to the column. Although by this process the possibility of channeling in a fixed-bed hydrogenation reactor in the trickle-flow regime is eliminated, according to the reference made to the Japanese patent in U.S. Pat. No. 4,428,922 (column 1, lines 55 to 68) there are still some drawbacks left, like high pressure-drop, the increase of energy consumption related thereto, a large recycle stream of hydrogen back through the hydrogenation reactor, and the use of additional equipment required for foaming and defoaming the working solution. In addition the through-put or productivity of the hydrogenation reactor is drastically reduced because of the large volume occupied by the excess hydrogen gas.

The WO 99/40024 aims to overcome the disadvantages of the above described processes and provides a simplified and advantageous process for the manufacture of hydrogen peroxide by the means of an AO-process using a fixed bed of catalyst particles in the hydrogenation step with high productivities.

This is achieved by a process for the manufacture of hydrogen peroxide by the AO-process comprising the alternate steps of hydrogenation and oxidation of a working solution containing at least one alkylanthraquinone dissolved in at least one organic solvent and extracting the hydrogen peroxide formed in the oxidation step, in which process the hydrogenation step is carried out in a hydrogenation reactor containing a fixed bed of the hydrogenation catalyst particles by feeding a concurrent flow of the working solution and a hydrogenating gas at the top of the reactor and by adjusting the ratio of liquid and gas feed-flows and the pressure of the hydrogenating gas to provide a self-foaming mixture of the working solution and the hydrogenating gas in the absence of any device or diffuser or spray nozzle for forming the foam, and by passing the foaming mixture downwards through the fixed bed of catalyst particles. The process of WO 99/40024 may be carried out optionally batch-wise or in a continuous manner. In addition, the hydrogenation step of the process may be carried out optionally under a pulsing foam flow regime of the working solution through the fixed-bed catalyst. According to WO 99/40024 it is possible to carry out the hydrogenation step of the AO-process directly in a conventional hydrogenation reactor of trickle-bed type under foaming of the working solution and the hydrogenating gas without any additional special equipment for the generation of the foam. Thus, the working solution and the hydrogenating gas can directly be fed into the hydrogenation reactor just by means of a conventional inlet pipe and the foaming is then achieved by adjusting the liquid and gas feed-flows and pressure of the hydrogenating gas. In addition there is no need to provide any special equipment at the bottom of the hydrogenation reactor for defoaming. The hydrogenation reactor containing the stationary trickle-bed employed in this is of conventional type and may take all forms and sizes generally encountered for the production of hydrogenation reactors of this type. Preferably the hydrogenation reactor is a tubular reactor (column).

According to WO 99/40024 there are several advantages related to the use of a foaming working solution in the hydrogenation step of the AO-process for the manufacture of hydrogen peroxide. The gas/liquid mass transfer is significantly increased because of the nature of the foam which consists of a dense dispersion of the hydrogenating gas in the liquid working solution. A good distribution of the working solution and the hydrogenating gas is maintained over the total length of the hydrogenation reactor. Consequently, for example the liquid surface velocity of a foaming working solution necessary to achieve good contact efficiency is approximately up to 2 to 3 times lower than that required for a non-foaming working solution. Thus, for foaming of the mixture of working solution and hydrogenating gas, the conditions in the hydrogenation reactor concerning the liquid and gas feed-flows and the pressure of the hydrogenating gas are set to provide a significant interaction of liquid (L) and hydrogenating gas (G); under these conditions the foam flow regime may be located between the trickle-flow and the pulsing flow regime. Accordingly, in the process of the invention the pressure of the hydrogenating gas is in the range of 1.1 to 15 bars (absolute), preferably in the range of 1.8 to 5 bars (absolute). The input superficial velocity of the hydrogen is usually at least 2.5 cm/s, preferably at least 3 cm/s. The input superficial velocity of the hydrogen is generally not higher than 25 cm/s, preferably not higher than 10 cm/s. The input superficial velocity of the liquid into the reactor is generally at least 0.25 cm/s, preferably at least 0.3 cm/s. The input superficial velocity of the liquid is generally not higher than 2.5 cm/s, preferably not higher than 1.5 cm/s, and more preferably, not higher than 1 cm/s.

The before described AO-processes based on the original Riedel-Pfleiderer concept and the manifold proposed improvements in the state of the art show that the AO-process is a multi-step process with a very complex, continuous and cyclic process chemistry of hydrogenation and oxidation, and hydrogen peroxide extraction, wherein this AO-process involves quite a number of chemicals like gases (e.g., hydrogen, oxygen), organic solvents, water, catalysts and working compounds, and wherein said AO-process results in a product, namely hydrogen peroxide, that due to its oxidizing power itself needs due care. Thus, operating and controlling the AO-process requires not only controlling physical parameters, like temperature, pressure, gas and/or liquid flow, but importantly also the operational control of the overall cyclic process chemistry, e.g., in terms of maintenance of catalytic activity, quality of the circulating working solution, particularly of the quality of the quinone working compounds and minimizing or suppressing the formation of undesired of by-products and/or their accumulation in the cyclic AO-process. Therefore, conventionally AO-process plants of the state of the art are designed for the industrial large-scale and even up to mega-scale production of hydrogen peroxide. Thus, conventional hydrogen peroxide production processes are normally carried out in large- to mega-scale hydrogen peroxide production plants with production capacities of about 40,000 to 330,000 (metric) tons per annum of hydrogen peroxide per year. Thus, currently there are plants in industrial operation with a production capacity of e.g., 40 to 50 ktpa (kilo tons per annum) at the low end, with a capacity of up to 160 ktpa, and the world largest mega-plants provide a capacity of 230 ktpa (Antwerp) and 330 ktpa (Thailand). In these processes, normally the production capacity in case of fixed beds is limited to 50 ktpa and usually plants with production capacities above 50 ktpa are operated with fluid-bed reactors.

These conventional AO-processes and respective production plants are complicated and require many and large installments of equipment, a number of competent staff for maintenance of the equipment and operation of the main and ancillary process steps, and special safeguards to handle the resulting hydrogen peroxide in its usually high concentrations of 40 percent, and the further concentration to 50 to 70 percent. Hence, much management attention and frequent maintenance is required. In addition to the complexity of such large- to mega scale production processes, it is noted that a substantial part of the produced hydrogen peroxide needs to be transported, e.g., by train or truck, to be used by customers in their own industrial applications. Such transports by train and truck need special precautions in view of related safety and security issues.

On the other hand a variety of the customers' industrial applications of hydrogen peroxide do not require highly concentrated hydrogen peroxide solutions for their applications, and therefore, as already explained above, the hydrogen peroxide solutions which were concentrated for the purpose of an economic transportation, usually to a hydrogen peroxide concentration of about 50 percent, are only used in a lower concentration of e.g., 1 to 15 percent at the customer site for its specific local application, e.g., particularly for the use in the pulp and paper industry or the textile industry, or for use in the mining industry or for environmental applications.

Furthermore, the current large scale hydrogen peroxide AO-processes according to the Riedel-Pfleiderer concept typically are highly capital- and energy-intensive processes, and the costs associated with them are passed on to low-volume end users. These end users would benefit from methods for producing hydrogen peroxide more economically without the concomitant capital costs and handling problems associated with current production schemes in smaller local plant environments close to the end user's site.

The U.S. Pat. No. 5,662,878 (issued Sep. 2, 1997 and assigned to the University of Chicago) already discusses the need of a process that would allow effective hydrogen peroxide production in small plant environments at a "host" industrial site. Briefly, the U.S. Pat. No. 5,662,878 describes a method for producing hydrogen peroxide comprising supplying an anthraquinone-containing solution; subjecting the solution to hydrogen to hydrogenate the anthraquinone; mixing air with the solution containing hydrogenated anthraquinone to oxidize the solution; contacting the oxidized solution with a hydrophilic membrane to produce a permeate; and recovering hydrogen peroxide from the permeate. The proposed method for producing hydrogen peroxide claims as a feature the utilization of membrane technologies to isolate hydrogen peroxide from the process reaction liquid. The teaching of U.S. Pat. No. 5,662,878 focuses on the utilization of the membrane technology for producing hydrogen peroxide that is virtually free of organics, and the ability to retain expensive organic solvents in reaction liquors for reuse.

According to the U.S. Pat. No. 5,662,878 the Riedel-Pfleiderer AO-processes are considered unsuitable for small scale production of about scale production and medium scale production. This is because the packed tower used for oxidation, and the column for hydrogen peroxide extraction are very large and do not easily scale up or down for modularity and operational flexibility. Also, typical extractors are multi-stage, very large in volume and are deemed difficult to scale down and to tend being highly unstable, and thus requiring a high degree of operational control.

Although, one might assume that the AO-process may be performed on small- to medium-scale so as to merely satisfy local demand, in the state of the art it is still deemed that such very complex AO-processes, especially as explained above with regard to the AO-process chemistry, require the use of many pieces of equipment, much management attention, and frequent maintenance, and that they are difficult to scale down and difficult to make such processes profitable. But, despite the proposed process according to the U.S. Pat. No. 5,662,878 using a membrane technology, the industrial production of hydrogen peroxide still relies on large-scale production facilities and related process optimizations. Thus, no small scale production facility (500-5,000 metric tons per year) or medium scale production facility (5,000-20,000 metric tons per year) is operated up to now. It appears that industry either ignored the industrial potential of small to medium scale hydrogen peroxide production facilities or assumed technical and/or economical hurdles due to the very high complexity of the multi-step AO-process and its operational control, which besides the controlling of physical process parameters also involves controlling the complex process chemistry. Hence, smaller-scale and decentralized industrial hydrogen peroxide production facilities, e.g., at a customer site, preventing the application of such small to medium scale methods for producing hydrogen peroxide, as compared to the well-established large scale industrial production and available logistics to ship hydrogen peroxide; and this even despite the required hazardous concentrating by distillation and final concentration of the hydrogen peroxide for the purpose of shipping and finally required dilution for use at customer site.

Therefore, even today a very high need exists in the art to produce hydrogen peroxide without the concomitant capital costs and handling problems associated with current large-scale to mega-scale production schemes, and to develop new processes that would allow effective hydrogen peroxide production in small to medium size plant environments, particularly on a customer industrial site, on low-volume end users' sites or other suitable "host" industrial sites. Ideally, such a hydrogen peroxide production in small to medium size plant environments should be suitable for being remotely operated and controlled, e.g., from a distant large-scale hydrogen peroxide production site, or any other site where staff optimally trained and experienced regarding the manufacture of hydrogen peroxide by the AO-process, particularly regarding the AO-process chemistry and the involved special chemicals including operational control and maintenance of quality and/or activity of said special chemicals, can be centralized and the control of the hydrogen peroxide production thus can be optimized and maintained in a non-hazardous and more practical and economical manner. Furthermore, these remotely controlled and operated small to medium hydrogen peroxide processes ("remotely controlled mini-AO processes") should be as modular as possible with the ability for quick start-up, shut-down and turnaround, while also accommodating variability in production rates, and as simple and robust as possible to allow for an end user friendly hydrogen peroxide production site, which may be easily remotely operated and controlled, for instance, from another distant large-scale hydrogen peroxide production plant, and which stably runs in continuous operation and may be easily supported and maintained with a minimum need of local (e.g., on customer site) technical, e.g., chemical and/or physical intervention at the site.

Hence, particularly in view of the economic significance of hydrogen peroxide, there is still a clear desire for small- to medium-scale hydrogen peroxide production plants which can produce aqueous hydrogen peroxide solutions directly for local use by applying the well-established AO-process technology according to the Riedel-Pfleiderer process, but which are also more cost effective manufacturing processes of hydrogen peroxide.

SUMMARY OF THE INVENTION

Therefore, the objective of the present invention is to provide an industrial technically, operationally and economically feasible process which is remotely controlled and which is automated to such an extent that it can be easily and safely operated by remote control, and such that very little local attention and support is required, e.g., in terms of chemical/or physical interaction. This aspect of the invention will be referred to in the following as "remote control". In particular the process should be suitable for being easily and safely operated and remotely controllable, such that it stably runs in continuous operation proximal to a site or on-site of an end user or hydrogen peroxide customer industrial application site, and that it can be easily supported and maintained with a minimum need of local (e.g., on customer site) technical, e.g., chemical and/or physical, intervention.

Another objective of the present invention is to provide a device for carrying out the remotely operable and controllable AO-process according to the present invention, which device is automated to such an extent that the AO-process in said device can be continuously operated proximal to a site or on-site of an end user or hydrogen peroxide customer industrial application site and which can be easily supported and maintained with a minimum need of local (e.g., on customer site) technical, e.g., chemical and/or physical, intervention. This aspect of the invention will be referred to in the following as "satellite plant" and/or "mother plant".

DETAILED DESCRIPTION

The invention is defined in the claims and shall be described in more details as follows. In a first aspect the present invention provides an industrial technically, operationally and economically feasible process which is remotely controlled and which is automated to such an extent that it can be easily and safely operated by remote control, and such that very little local attention and support is required. This aspect of the invention will be referred to in the following as "remote control".

Accordingly, in this first aspect the present invention relates to a process for the manufacture of hydrogen peroxide by the AO-process comprising the two alternate essential steps of (a) hydrogenation of a working solution in a hydrogenation unit (hydrogenator) in the presence of a catalyst, wherein said working solution contains at least one alkylanthraquinone dissolved in at least one organic solvent, to obtain at least one corresponding alkylanthrahydroquinone compound; and (b) oxidation of said at least one alkylanthrahydroquinone compound to obtain hydrogen peroxide in an oxidation unit; and further comprising the step of (c) extracting the hydrogen peroxide formed in the oxidation step in an extraction unit, wherein the units of step (a) to (c), optionally together with further ancillary units as appropriate, constitute a hydrogen peroxide production site, wherein one or more of said units are equipped with one or more sensors for monitoring one or more AO-process parameters, optionally involving at least one chemical AO-process parameter, at the hydrogen peroxide production site, said sensors being interconnected with one or more first computers at the hydrogen peroxide production site, said first computers being linked via a communication network to one or more second computers in a control room being remote from the hydrogen peroxide production site, and wherein said control room is remotely controlling, particularly remotely operating and/or controlling, said hydrogen peroxide production site.

Generally, it is known in the state of the art to control processes, including chemical processes by means of computers and appropriate software. Also, in a very general and theoretical sense remote control techniques for selected applications performed through internet are described for simple physical parameters, namely temperature, liquid level, pneumatic pressure and liquid flow (for example, K. Balasubramanian and A. Cellatoglu, International Conference on Control, Automation, Communication and Energy Conservation, 2009, XP002665408). However, until yet no chemical process, in particular no complex chemical process like the AO-process for the manufacture of hydrogen peroxide, has been described being remotely controlled; and particularly no such AO-process is described being remotely operated and/or controlled or in other words being remotely operationally controlled.

Until now, remote control techniques are known to be applied only to uncomplicated, easily operable processes.

Thus, by the present invention for the first time remote control techniques are applied to a complex chemical process like the complex multi-step cyclic AO-process which besides the controlling of physical process parameters also involves controlling the complex AO-process chemistry and the involved special chemicals, e.g., including operational control and maintenance of quality and/or activity of said special chemicals. As explained before, the AO-process is a multi-step process with a very complex, continuous and cyclic process chemistry of hydrogenation and oxidation, and hydrogen peroxide extraction, wherein this AO-process involves quite a number of chemicals like gases (e.g., hydrogen, oxygen), organic solvents, water, catalysts and working compounds, and wherein said AO-process results in a product, namely hydrogen peroxide, that due to its oxidizing power itself needs due care. Thus, operating and controlling the AO-process requires not only controlling physical parameters, like temperature, pressure, gas and/or liquid flow, but importantly also the operational control of the overall cyclic process chemistry, e.g., in terms of maintenance of catalytic activity, quality of the circulating working solution, particularly of the quality of the quinone working compounds and minimizing and/or suppressing the formation of undesired, e.g., of inactive and/or hazardous, by-products and/or their accumulation in the cyclic AO-process. Maintenance and control of catalytic activity and/or catalyst stability on the one hand, and maintenance of the quality, e.g., composition and concentration of useful constituents and purity degree, of the working solution, particularly of the quinone and/or hydroquinone working compound forms and minimizing and/or suppressing and/or possibly reconverting of non-active or potentially hazardous quinone by-products evolving during the cyclic AO-process into useful quinones and/or hydroquinones, is of essential importance for maintaining the AO-process under control and operating a continuously safe and ensuring an economically productive performance of the AO-process for the manufacture of hydrogen peroxide.

The term "remote control" in a first sense of the invention means that the AO-process is "reliably operated automatically in a remote location", e.g., reliable concerning, for example, automatically operating in a safe and non-hazardous manner with only minimum need of steering the AO-process chemistry and maintenance of AO-process performance and productivity. Thus, the term "remote control" in the context of the present invention is not limited to being understood as a simple remote control of only physical parameters, but the meaning of the term "remote control" in the present invention also includes the remote operational control of process of the AO-process chemistry. Therefore, the meaning of the term "remote control" equally includes terms like "remote operation and control", "remote operational control", "remote operation and control of process chemistry", "remote operation and control of process chemistry and/or physical process parameters", "remote operation and control of chemical and/or physical process parameters", "remotely operating and/or controlling"; and similar and/or any variation of said terms. Particularly the term "remote control" in the meaning of the invention encompasses a "remote operation and control of a satellite AO-process depending on a mother AO-process", particularly wherein the dependence is on working solution, catalyst and operational control, "remote operation and control of a satellite AO-process plant depending on a distant mother AO-process" plant, particularly such a "remote operation and control of a satellite AO-process depending on a mother AO-process, wherein the remote operation and control of the working solution of the said satellite AO-process depends on the distant mother AO-process"; and similar and/or any variation of said terms. The control room for remotely controlling the hydrogen peroxide production site may be located at any other suitable site which is different and distant from said remotely controlled hydrogen peroxide production site. Usually, this control room will be located or centralized where appropriate computer equipment can be installed and connected to a communication network, and where the remote control of the hydrogen peroxide production can be optimized and maintained in more practical and economical manner than at the production site itself. At such a site staff is available which is optimally trained and experienced regarding the manufacture of hydrogen peroxide by the AO-process and capable to remotely control said distant hydrogen production site, and either to remotely intervene, for instance via the communication network or via phone call or e-mail and the like, or to organize appropriate local intervention, for instance by a local operator or by sending dedicated and experienced technical support staff or service technicians, at the remotely controlled hydrogen peroxide site in case of need. According to the present invention such remote control is applied for the first time to the operation of a particular complex and cyclic chemical process, that is to say to the operation of the complex cyclic AO-process for the manufacture of hydrogen peroxide, involving several interrelated cyclic process steps of a hydrogenation, an oxidation and an extraction step, and also comprising the remote operational control of the AO-process chemistry, particularly meaning the remote operational control of the AO-process chemistry related to the employed circulating working solution, especially the one or more working compounds (quinone and hydroquinone compounds; for more details see further below) contained therein and any by-product formed therefrom. As stated before, besides the hydrogenation catalyst activity and stability, the quality of the circulating working solution in the AO-process is crucial for a reliable performance of an AO-process. Thus, in a conventional AO-process it is essential to regularly monitor the composition of the working solution to safeguard its productivity, which is normally done in a conventional production facility by regularly, qualitatively and/or quantitatively, analyzing samples of the working solution withdrawn from the AO-process for identifying any degradation and/or changes in the concentration and/or composition of the working solution. Surprisingly, the inventors of the present invention found that despite the complexity of the AO-process for the manufacture of hydrogen peroxide, especially despite the complexity incurred by the permanently circulating working solution, it is nevertheless possible to remotely control such an AO-process, particularly to remotely operate and control the AO-process.

In a variant of the invention the control room for remotely controlling the hydrogen peroxide production site is located at another hydrogen peroxide plant being different from said remotely controlled hydrogen peroxide production site. Ideally this other hydrogen peroxide plant is a plant with a larger scale of hydrogen peroxide production capacity than in said remotely controlled hydrogen peroxide site. Preferably this other hydrogen peroxide plant provides for a hydrogen peroxide production capacity of at least 30 kilo tons per year, and more preferably of at least 40 kilo tons per year.

As compared to conventional large scale hydrogen peroxide production, the process according to the invention is simplified and automated as much as possible in order to allow for being easily and safely operated and remotely controllable, such that it stably runs in continuous operation proximal to or on-site of an end user or hydrogen peroxide customer industrial application site, and such that it can be easily supported and maintained with a minimum need of local (e.g., on customer site) technical and/or physical intervention. Surprisingly, it was found that such a remotely controllable process for the hydrogen peroxide production proximal to or on-site of a hydrogen peroxide using customer ("host" site) may be achieved if the process is sized to be carried out as a small- to medium-scale hydrogen peroxide production process.

Thus, the process of the invention is particularly suitable for the manufacture of hydrogen peroxide by the AO-process wherein said process is a small to medium scale AO-process with a production capacity of hydrogen peroxide of up to 20 kilo tons per year (ktpa). Preferably said process is operated with a production capacity of hydrogen peroxide of up to 15 kilo tons per year (ktpa), and more preferably with a production capacity of hydrogen peroxide of up to 10 kilo tons per year (ktpa), and in particular a production capacity of hydrogen peroxide of up to 5 kilo tons per year (ktpa). The dimension ktpa (kilo tons per annum) relates to metric tons. Further, said small- to medium-scale hydrogen peroxide production process scale will be referred to in the following as "mini-AO-process" and "mini-AO-plant", respectively.

According to a variant of the invention an industrial technically, operationally and economically feasible remotely controllable small- to medium-scale hydrogen peroxide production process ("remote control mini-AO-process") and, as described further below, a corresponding device with remote control for the production of hydrogen peroxide ("remote control mini-AO-plant") is provided. The "remote control mini-AO-process" may be operated with a maximum production capacity of up to 20 ktpa. Preferably this mini-AO-process has an even lower maximum production capacity of up to 15 ktpa (kilo tons per annum). Usually, the mini-AO-process according to the invention is operated with a capacity in the range of 2 to 15 ktpa.

The mini-AO-process according to the invention may be designed in a flexible manner for a variety of any other ranges within said capacity scope, e.g., to provide a capacity which best fits to the local needs where the process is operated. Thus, as an example and without limitation, possible capacity ranges are from 2-5 ktpa, 2-6 ktpa, 2-7 ktpa, 2-8 ktpa, 2-9 ktpa, 2-10 ktpa, 2-11 ktpa, 2-12 ktpa, 2-13 ktpa, 2-14 ktpa, 2-15 ktpa; 3-6 ktpa, 3-7 ktpa, 3-8 ktpa, 3-9 ktpa, 3-10 ktpa, 3-11 ktpa, 3-12 ktpa, 3-13 ktpa, 3-14 ktpa, 3-15 ktpa; 4-6 ktpa, 4-7 ktpa, 4-8 ktpa, 4-9 ktpa, 4-10 ktpa, 4-11 ktpa, 4-12 ktpa, 4-13 ktpa, 4-14 ktpa, 4-15 ktpa; 5-6 ktpa, 5-7 ktpa, 5-8 ktpa, 5-9 ktpa, 5-10 ktpa, 5-11 ktpa, 5-12 ktpa, 5-13 ktpa, 5-14 ktpa, 5-15 ktpa; 6-7 ktpa, 6-8 ktpa, 6-9 ktpa, 6-10 ktpa, 6-11 ktpa, 6-12 ktpa, 6-13 ktpa, 6-14 ktpa, 6-15 ktpa; 7-8 ktpa, 7-9 ktpa, 7-10 ktpa, 7-11 ktpa, 7-12 ktpa, 7-13 ktpa, 7-14 ktpa, 7-15 ktpa; 8-9 ktpa, 8-10 ktpa, 8-11 ktpa, 8-12 ktpa, 8-13 ktpa, 8-14 ktpa, 8-15 ktpa; 9-10 ktpa, 9-11 ktpa, 9-12 ktpa, 9-13 ktpa, 9-14 ktpa, 9-15 ktpa; 10-11 ktpa, 10-12 ktpa, 10-13 ktpa, 10-14 ktpa, 10-15 ktpa; 11-12 ktpa, 11-13 ktpa, 11-14 ktpa, 11-15 ktpa; 12-13 ktpa, 12-14 ktpa, 12-15 ktpa; 13-14 ktpa, 13-15 ktpa; 14-15 ktpa.

In a preferred process for the manufacture of hydrogen peroxide by the AO-process according to the invention the process has a production capacity of hydrogen peroxide of 2,000 to 10,000 metric tons per year), or more preferably in a range of 2,000 to 5,000 metric tons per year (2 to 5 ktpa). Typically, the size of a plant for the manufacture of hydrogen peroxide depends on the production capacity. For example, within the preferred design range between 2 and 10 ktpa a plant of 3 ktpa capacity will be much smaller than a 10 ktpa plant. Therefore, in a more preferred embodiment of the invention, e.g., for economic reasons, the design of the mini-AO-process pertains to manufacture of hydrogen peroxide by the AO-process or to mini-AO-plants with narrower capacity ranges, as for instance, 2-3 ktpa, 3-5 ktpa, 5-7.5 ktpa or 7.5-10 ktpa. Similarly, also for higher capacities the more narrow capacity ranges are preferred, as for instance, 10-12.5 ktpa, 12.5-15 ktpa.

The units being equipped with one or more sensors for monitoring one or more AO-process parameters usually are those of the main AO-process such as the hydrogenation unit (hydrogenator), an oxidation unit (oxidizer), and an extraction unit (extractor), or any other obligatory or optional unit of the main AO-process. The units being equipped with one or more sensors may also be any unit of any ancillary process unit as described herein. The equipment and/or means involved in the manufacture of hydrogen peroxide according to the AO-process, for example but without limitation, may be one or several equipment selected from pumping systems, valves, pipes, vessels, compressors, heating and cooling system, outlets, means for providing power and means for measuring the pressure, temperature, quantity, flow rate, density, viscosity, catalyst activity, acidity, purity, concentration, the hydrogen peroxide productivity or other process parameters relevant for the production of hydrogen peroxide according to the AO-process. There may be also means, as appropriate, for monitoring electric current, voltage and the like.

The one or more sensors for monitoring AO-process parameters may be of any suitable type, and are in particular those already commonly used in AO-processes for steering the complete hydrogen peroxide production cycle, or any individual or combined AO-process steps. In a variant of the invention, these sensors may be those as commonly used in large to mega scale hydrogen production plants or processes. Or in another variant, the sensors may be modified or specifically adapted to the small to medium scale hydrogen peroxide production plant or processes. In yet another variant of the mini-AO-process and plant according to the invention, a suitable combination of those commonly used in used in large to mega scale hydrogen production and those modified or specifically adapted to the small to medium scale hydrogen peroxide production, may be involved.

The one or more sensors may be suited and employed for monitoring AO-process parameters, for example but without limitation, such as pressure, temperature, quantity, flow rate, density, viscosity, catalyst activity, acidity, purity, concentration, hydrogen peroxide productivity or other process parameters relevant for the production of hydrogen peroxide according to the AO-process. A sensor or a combination of sensors may be suited to directly monitor or measure a parameter relevant for the production of hydrogen peroxide according to the AO-process, or the sensor or a combination of sensors may indirectly monitor or measure other data or a variety of other data, and then the parameter relevant for steering the production of hydrogen peroxide according to the AO-process is calculated from said monitored or measured data.

Furthermore, a camera or a variety of cameras or other optical equipment to measure optical effects may be used in addition to monitor, measure and/or survey the AO-process, its equipment and means, or parameters, respectively.

For the mini AO-process monitoring and/or process control the following parameters, but without limitation, are considered being important to be monitored and/or controlled:

(a) The flow rates in the process of: hydrogen, oxygen and demineralized water for extraction;
(b) The working solution flow rate: for the hydrogenator and for the oxidizer; and the working solution recycle flow rate for hydrogenator and oxidizer;
(c) The flow rates of utilities like steam and cooling water: wherein the range of said flow rates may be varied according to the mini-AO-plant capacity for the production of hydrogen peroxide.
(d) The pressure: hydrogenator degasser (i.e., 0.5 barg to about 5 barg); oxidizer degasser (i.e., 0.5 to about 5 barg).
(e) The temperature: hydrogenator outlet (40~65° C.), oxidizer outlet (40~55° C.).
(f) Interface level: extraction column, coalescer; and their respective function and/or performance characteristics.
(g) The differential pressure: hydrogenation filtration (i.e., 0 to about 1 barg); hydrogenation column (i.e., 0 to about 2 barg); oxidizer column (i.e., 0 to about 0.5 barg).

Normally, for a conventional AO-process regular monitoring of the composition of the working solution is crucial to safeguard its productivity. Thus, in a conventional AO-process, e.g., in a conventional production facility for the manufacture of hydrogen peroxide by the AO-process, this regular monitoring of the composition of the working solution is normally done by regularly, qualitatively and/or quantitatively, analyzing samples of the working solution withdrawn from the AO-process for identifying any degradation and/or changes in the concentration and/or composition of the working solution. Surprisingly, the inventors of the present invention found that despite this complexity of the AO-process for the manufacture of hydrogen peroxide, especially despite the complexity incurred by the permanently circulating working solution, it is nevertheless possible to remotely control such an AO-process, particularly to remotely operate and control the AO-process. Surprisingly, within the present invention it was found out that there is no mandatory need for permanently controlling the working solution, e.g., by means, for example such as analytical means, as usually foreseen in conventional AO-processes. According to the present invention the monitoring of the working solution, that is to say the remote control, particularly the remote operational control (remote operation and control) of the working solution can be achieved by indirect or direct remote control. When monitoring the working solution, e.g., the chemical aspects of the working solution, by indirect remote control, this can be achieved by just remotely controlling one or more the above mentioned AO-process parameters or any other suitable AO-process parameter indicative for the productivity and/or quality of the working solution, that is to say but without limitation, for example by just remotely controlling one or more parameters indicative for the productivity and/or consumption of hydrogen and/or oxygen in the AO-process.

When directly monitoring the working solution, e.g., by direct remote control of chemical aspects of the working solution, this can be achieved by remotely controlling one or more physical and/or chemical parameters indicative for the productivity and/or quality of the working solution, that is to say but without limitation, for example by remotely controlling one or more parameters indicative for the productivity and/or cyclic conversion of one or more working compounds from the quinone form into the hydroquinone form and vice versa, and/or one or more parameters indicative for the formation of undesired quinone by-products or their reconversion into a quinone form and/or into a hydroquinone form useful for, e.g., active in, the AO-process.

Usually, according to the present invention the overall AO-process and its parameters is under regular remote control, e.g., real-time measured parameters as indicated above under (a) to (g), while on the other hand it is not obligatory to regularly, especially not obligatory to continuously or permanently, remotely control the working solution. The term "regular" in this context means that a strict routine, e.g., everyday or unvarying, uniform, constant and/or strict compliance routine needs to be continuously or permanently followed. Therefore, according to the invention the AO-process can be run for some period by just remotely controlling one or more the above mentioned AO-process parameters, while for that period there is no direct remote control of the working solution required. For example, then any direct remote control, e.g., any direct remote operation and control, of the working solution then is performed only intermittently and/or periodically. The person skilled in operating an AO-process knows interpreting the measures of one or more remotely controlled AO-process parameters to thereby indirectly conclude on the in-process status of the working solution, and therefore the skilled person can decide on its own discretion on any interval or period, when intermittent and/or periodical direct remote control, e.g., direct remote operational control, of the working solution should be recommendable and/or required. Such decisions in indirectly remotely operating and controlling the working solution, for example, may be based on one or more pre-defined and/or one or more pre-set process conditions in terms of said AO-process parameters, or any range thereof, as a process standard the running AO-process must comply with and the running AO-process is remotely controlled to stay within that process standard. Suitable AO-process standards and also related parameters suitable for the direct remote control, e.g., for the direct remote operational control, of the working solution are known to the person skilled in the AO-process. Such parameters may be linked by calculation methods to correspond to those analytical parameters of analytical systems as normally applicable in a conventional AO-process. For example, but without limitation, they are based on especially HPLC or polarography, but may also be any other chromatographic parameter (including parameters and/or methods of: gas chromatography, GC; liquid chromatography, LC; various HPLC-types etc.) or other analytical parameter and method known to the person skilled in the art for being suitable in the context of an AO-process for controlling the working solution. Furthermore, such analytical parameters or analytical system may also be directly measured or used for direct measurement, respectively, if such analytical parameter or analytical system is adapted for the measurement being conducted on-line by automatic sampling and transmission of the result of a measured analytical parameter e.g., by internet or any other suitable on-line communication means. In preferred embodiments according to the present invention, however, the classical analytical parameters of an AO-process related to the working solution are supplemented or even more preferably replaced by appropriate electronic equipment allowing for the measurement being conducted as a fully automatic, remote analysis, in particular with no involvement of any operator or staff at the remotely operated and remotely controlled site of the hydrogen peroxide production, and then the measurement of the one or more analytical parameter is directly conducted on-line and transmission of the result of an electronically measured analytical parameter e.g., by internet or other on-line communication means. For example, but without limitation, such parameters may be such as density, viscosity, refractive index, color, including wavelength and/or extinction coefficient, interfacial tension of water, acidity of the working solution and/or the extracted aqueous hydrogen peroxide solution, e.g., by automatic titration or preferably by electronic pH-measurement, any spectroscopic method, especially IR methods, parameters measured by refractive index meters, or other analytical parameters and methods known to the person skilled in the art for being suitable in the context of controlling analytical parameters of a working solution in an AO-process, if such analytical parameter or analytical method is adapted for the measurement being conducted on-line by automatic measurement and transmission of the result of a measured analytical parameter e.g., by internet or any other suitable on-line communication means. According to a preferred embodiment of the present invention there is no need for complete analysis of the working solution, and in this case preferably a near infra-red (NIR) spectroscopy on-line analyzer is used for remotely controlling, e.g., for remotely operating and controlling, the hydroquinone (QH) concentration of the working solution. According to another preferred embodiment of the present invention without need for complete analysis of the working solution, in this case preferably a refractive index meter is used for remotely controlling, e.g., for remotely operating and controlling the working solution, and particularly for remotely operating and controlling the extraction operations, e.g., the extraction of the hydrogen peroxide from the working solution in extraction step (c) of the process according to the invention. Both techniques, the near infra-red (NIR) spectroscopy on-line analyzer and the refractive index meter, are several and separate means independent from each other, and each can be used either alone for remotely operating and controlling the AO-process according to the present invention. Or preferably, both techniques, the near infra-red (NIR) spectroscopy on-line analyzer and the refractive index meter, are used together for remotely operating and controlling the AO-process according to the present invention. Furthermore, remotely operationally controlling the working solution may also mean to remotely operate and/or control any optional dosing, e.g., optional continuous or intermittent or periodically dosing, of fresh and/or regenerated working solution into the running AO-process, said dosing being automatically and/or manually conducted by on-line means, especially interdependent and/or interactively as a reflection of any measurement being conducted on-line by automatic measurement and transmission of the result of a measured analytical parameter e.g., by internet or any other suitable on-line communication means.

Another aspect of the present invention is to provide a remote control process for the production of hydrogen peroxide which is technically, operationally and economically feasible when carried out in a small- to medium-scale hydrogen peroxide production plant, preferably on-site of a hydrogen peroxide using customer ("host" site). The process for the manufacture of hydrogen peroxide by the AO-process under remote control according to the invention particularly allows for installing and operating a hydrogen peroxide production site which is located proximal to or on-site of an end user site or customer site utilizing the hydrogen peroxide an industrial application. Preferably, this end user or customer site is a site with an industrial application of hydrogen peroxide selected from pulp and paper industry or the textile industry, or the mining industry or sites with environmental applications.

The process for the manufacture of hydrogen peroxide by the AO-process under remote control according to the invention is particularly suited being operated such way that from the extraction unit at least a portion of an aqueous solution of hydrogen peroxide is delivered to a site of use that is proximal to the hydrogen peroxide production site, preferably proximal to the extraction unit of said hydrogen peroxide production site. Ideally, in this variant of the process according to the invention the aqueous hydrogen peroxide solution is delivered as an aqueous hydrogen peroxide solution containing a predetermined concentration of hydrogen peroxide which is suitable for being directly utilized in the specified industrial application of the site of use.

Furthermore, by the invention, a robust, simple and modular industrial small to medium scale remotely controllable process for the production of hydrogen peroxide based on the conventional AO-process technology is provided, which is feasible to be installed at a customer site, especially a remote (customer) site and is for an end user friendly plant which may be remotely controlled, e.g., remotely operated and controlled, from a different and even distant site, e.g., from a distant large-scale hydrogen peroxide production site, and which stably runs for longer periods, e.g., for periods of at least several months, and at minimum for at least 3 months, in continuous operation with a minimum need of local (e.g., on customer site) technical and/or physical intervention, in particular with regard to the reversion of the of the working solution and/or the regeneration of the hydrogenation catalyst. Therefore, in a variant of the process for the manufacture of hydrogen peroxide by the AO-process under remote control according to the invention, the hydrogenation, oxidation and extraction steps of the AO-process are performed in a reactor system which is designed as a compact modular system of a hydrogenation unit for the hydrogenation of a working solution in the presence of a catalyst, of an oxidation unit and of an extraction unit, and wherein said reactor system is configured to operate without a reversion (regeneration) unit, and wherein the working solution and/or the catalyst are replaced and/or treated for regeneration or reactivation only intermittently or periodically. In particular, the reactor system is configured to operate without a (permanent) reversion (regeneration) unit for continuous or permanent reversion of the working solution. The only intermittent or periodical replacing and/or treating for regeneration or reactivation of the working solution and/or the catalyst needs to be performed only with a low frequency, e.g., only after periods of a certain duration, e.g., of some weeks or months, The reactor system is almost completely closed, e.g., meaning that only minimum needed in- and/or outlets are foreseen for performing the AO-loop process of hydrogenation, oxidation and the extraction of the aqueous hydrogen peroxide product. In a further variant of the process for the manufacture of hydrogen peroxide by the AO-process according to the invention, the hydrogenation, oxidation and extraction steps of the AO-process are performed in a reactor system which is designed as a compact modular system of a hydrogenation unit for the hydrogenation of a working solution in the presence of a catalyst, of an oxidation unit and of an extraction unit, and wherein said reactor system is configured to operate without a reversion (regeneration) unit, in particular without a (permanent) reversion unit for continuous reversion of the working solution, and wherein the working solution and/or the catalyst are replaced and/or treated for regeneration or reactivation only intermittently or periodically with a low frequency of only about monthly periods, preferably only after periods of at least 3 months in the loop of the AO-process steps (a), (b) and (c).

Surprisingly, it has been found that the second objective of the invention is realized when use is made of a specific equipment for the manufacture of hydrogen peroxide according to the AO-process which is remote controlled. In this aspect, the present invention provides a device for carrying out the remote control mini-AO-process as described above, e.g., which device is automated to such an extent that it can be operated by remote control in a way that requires very little local attention and support at the hydrogen peroxide site, and therefore is suitable as a hydrogen peroxide site located proximal to or on a customer site or any other "host" site. This is particularly surprising, especially in view of the complexity of the AO-process, wherein the regular monitoring of the composition of the working solution is crucial to safeguard its productivity. The present invention therefore also relates to a computer-controlled mini-AO-plant for carrying out the process according to the invention for the manufacture of hydrogen peroxide, particularly a computer-controlled mini-AO-plant of small to medium production scale and which is located at a remote or decentralized end user site.

Therefore, the invention also pertains to a computer-controlled device for carrying out a process for the manufacture of hydrogen peroxide by the AO-process according to any variant of the invention as described above, comprising a reactor system of (a) a hydrogenation unit (hydrogenator) for hydrogenation of a working solution in the presence of a catalyst, wherein said working solution contains at least one alkylanthraquinone dissolved in at least one organic solvent, to obtain at least one corresponding alkylanthrahydroquinone compound; and (b) an oxidation unit for oxidation of said at least one alkylanthrahydroquinone compound to obtain hydrogen peroxide; and further comprising (c) an extraction unit for extracting the hydrogen peroxide formed in the oxidation unit, wherein the units (a) to (c), optionally together with further ancillary units as appropriate, being a hydrogen peroxide production site, characterized in that one or more of said units being equipped with one or more sensors for monitoring one or more AO-process parameters, particularly involving at least one chemical AO-process parameter, at the hydrogen peroxide production site, said sensors being interconnected with one or more first computers at the hydrogen peroxide production site, said first computers being linked via a communication network to one or more second computers in a control room being remote from the hydrogen peroxide production site, and wherein said control room is remotely controlling, particularly remotely operating and/or controlling, said hydrogen peroxide production site. For any details regarding the remote control, particularly the remote operational control, reference is made to the respective description given above in the context of the remotely controlled AO-process according to the invention, said details being equally applicable here in the context of the computer-controlled device according to the invention for carrying out a process for the manufacture of hydrogen peroxide by the AO-process.

The computer-controlled device of the present invention will comprise at least a hydrogenation unit (hydrogenator), an oxidation unit (oxidizer), and an extraction unit (extractor), and further as needed and appropriately assembled and communicating for the purpose of manufacture of hydrogen peroxide according to the AO-process, one or several equipment selected from pumping systems, valves, pipes, vessels, compressors, heating and cooling system, outlets, means for providing power and means for measuring the pressure, temperature, flow rate, density, viscosity, catalyst activity, acidity, purity, concentration, hydrogen peroxide productivity or other process parameters relevant for the production of hydrogen peroxide according to the AO-process, one or more of said units and/or means being equipped with one or more sensors for monitoring one or more process parameters such as described above, said sensors being interconnected with one or more first computers, said first computers being linked to one or more second computers in a control room via a communication network, said control room being remote from the mini-AO-plant. Said first computer(s) is/are (a) computer(s) which take(s) care of the control and safeguarding of the mini-AO-plant. Preferably, said first computer(s) is/are placed in close proximity of the assembly of the hydrogenation unit (hydrogenator), the oxidation unit (oxidizer) and the extraction unit (extractor), i.e., in the same location as the mini-AO-plant.

The invention therefore also pertains to a computer-controlled device wherein one or more of said units of the reactor system being equipped with one or more sensors for monitoring one or more AO-process parameters such as pressure, temperature, quantity, flow rate, density, viscosity, catalyst activity, acidity, purity, concentration, hydrogen peroxide productivity or other process parameters relevant for the production of hydrogen peroxide according to the AO-process.

The invention in a preferred embodiment also pertains to a computer-controlled device wherein one or more of said units of the reactor system being equipped with one or more sensors for monitoring one or more AO-process parameters related to the monitoring of the composition of the working solution, which is crucial to safeguard its productivity, as described above in the context of the remotely controlled AO-process of the present invention. Again, for any details regarding the remote control equipment, particularly the remote operational control equipment, reference is made to the respective description of any equipment given above in the context of the remotely controlled AO-process according to the invention, said details being equally applicable here in the context of the computer-controlled device according to the invention for carrying out a process for the manufacture of hydrogen peroxide by the AO-process. Thus, according to the present invention the equipment for monitoring of the working solution, that is to say the equipment for remote control, particularly the equipment for remote operational control (remote operation and control equipment) of the working solution can be configured for indirect or direct remote control. When monitoring the working solution, e.g., the chemical aspects of the working solution, by equipment for indirect remote control, this can be achieved by equipment for just remotely controlling one or more the above mentioned AO-process parameters or any other suitable AO-process parameter indicative for the productivity and/or quality of the working solution, that is to say but without limitation, for example by any equipment for just remotely controlling one or more parameters indicative for the productivity and/or consumption of hydrogen and/or oxygen in the AO-process.

When using equipment in the device for directly monitoring the working solution, e.g., equipment for direct remote control of chemical aspects of the working solution, this can be achieved by any equipment suitable for remotely controlling one or more physical and/or chemical parameters indicative for the productivity and/or quality of the working solution, that is to say but without limitation, for example equipment suitable for remotely controlling one or more parameters indicative for the productivity and/or cyclic conversion of one or more working compounds from the quinone form into the hydroquinone form and vice versa, and/or one or more parameters indicative for the formation of undesired quinone by-products or their reconversion into a quinone form and/or into a hydroquinone form useful for the AO-process.

According to the present invention equipment is used in the device to ensure that the overall AO-process and its parameters is under regular remote control, e.g., under remote control by real-time measured parameters as indicated above under (a) to (g), while on the other hand it is not obligatory to regularly, especially not obligatory to continuously or permanently, remotely control the working solution. Although, according to the invention the AO-process can be run for some period by just remotely controlling one or more the above mentioned AO-process parameters, while for that period there is no direct remote control of the working solution required, nevertheless it is preferred that there is also equipment installed for directly monitoring the working solution, e.g., equipment for direct remote control of chemical aspects of the working solution, even if this equipment will be used only intermittently or periodically as described above.

Such equipment may comprise analytical systems as normally applied in a conventional AO-process. For example, but without limitation, such equipment may especially involve HPLC or polarography equipment, but may also be any other chromatographic equipment (including equipment of: gas chromatography, GC; liquid chromatography, LC; various HPLC-types etc.) or other analytical equipment known to the person skilled in the art for being suitable in the context of an AO-process for controlling the working solution. Furthermore, such analytical equipment or analytical system may also be suitable for direct measurement, respectively, if such equipment or analytical system is adapted for measurement being conducted on-line by automatic sampling and transmission of the result of a measured analytical parameter e.g., by internet or any other suitable on-line communication means. In preferred embodiments according to the device of the present invention, however, the classical analytical equipment of an AO-process related to the working solution is supplemented or even more preferably replaced by appropriate electronic equipment allowing for the measurement being conducted as a fully automatic, remote analysis, in particular with no involvement of any operator or staff at the remotely operated and remotely controlled site of the hydrogen peroxide production, and then the equipment allows for the measurement of the one or more analytical parameter being directly conducted on-line and transmission of the result of an electronically measured analytical parameter e.g., by internet or other on-line communication means. For example, but without limitation, such equipment may be suitable for determining parameters such as density, viscosity, refractive index, color, including wavelength and/or extinction coefficient, interfacial tension of water, acidity of the working solution and/or the extracted aqueous hydrogen peroxide solution, e.g., by automatic titration or preferably by electronic pH-measurement, any spectroscopic method, especially IR methods, parameters measured by refractive index meters, or other analytical parameters and methods known to the person skilled in the art for being suitable in the context of controlling analytical parameters of a working solution in an AO-process, if the equipment for determining such analytical parameter or analytical method is adapted for the measurement being conducted on-line by automatic measurement and transmission of the result of a measured analytical parameter e.g., by internet or any other suitable on-line communication means. According to a preferred embodiment of the device of the present invention, as there is no need for complete analysis of the working solution, a near infra-red (NIR) spectroscopy on-line analyzer is used for remotely controlling, e.g., for remotely operating and controlling, the hydroquinone (QH) concentration of the working solution. According to another preferred embodiment of the present invention without need for complete analysis of the working solution, a refractive index meter is used for remotely controlling, e.g., for remotely operating and controlling the working solution, and particularly for remotely operating and controlling the extraction operations, e.g., the extraction of the hydrogen peroxide from the working solution in extraction step (c) of the process according to the invention. The equipment for both techniques, the near infra-red (NIR) spectroscopy on-line analyzer and the refractive index meter, are several and separate means independent from each other, and each can be used either alone in the device of the present invention for remotely operating and controlling the AO-process according to the present invention. Or preferably, the equipment for both techniques, the near infra-red (NIR) spectroscopy on-line analyzer and the refractive index meter, are used in the device of the present invention together for remotely operating and controlling the AO-process according to the present invention. Furthermore, there may be equipment for remotely operationally controlling the working solution suitable to remotely operate and/or control any optional dosing, e.g., optional continuous or intermittent or periodically dosing, of fresh and/or regenerated working solution into the running AO-process, said equipment for dosing allowing for automatically and/or manually conducting the dosing by on-line means, especially interdependent and/or interactively as a reflection of any measurement being conducted on-line by automatic measurement and transmission of the result of a measured analytical parameter e.g., by internet or any other suitable on-line communication means.

In a further aspect of the invention the computer-controlled device comprises specific safety equipment or safety means (interlock system) to allow for automatic safe shutdown in case of incidents that require interruption of the hydrogen peroxide production for e.g., for safety reasons or other deficiencies with regard to the process or utilities, to the equipment, sensors, computers, communication network and the like. In such case said first computer will include a safety PLC (independent protection layer) or hardwired relay based system for the monitoring and automatic safe shutdown of the plant in case of abnormalities (interlock system). In such cases, a beep or cell phone message will be sent to the local operator in charge of the plant, which will then enter the plant at a convenient time (maybe next day; as the plant will be provided with intermediate product storage, the client or consumer will not be affected) in order to restart the plant safely (e.g., in this case of automatic safe shutdown no remote startup foreseen).

Said second computer(s), via which the process parameters can be analyzed and monitored and the process according to the present invention controlled, preferably by one or more qualified AO-process operators, is/are placed in a control room which is remote from the mini-AO-plant. The control room can be remote from the mini-AO-plant (i.e., the assembly of the hydrogenator, the oxidizer and the extractor), but still on the same or close to the production site as the mini-AO-plant. However, in a preferred embodiment, the control room is at a different site which can be located in the same country, but also in another country or even on another continent. Preferably, the control room is on the site of a large conventional plant for the manufacture of hydrogen peroxide by the AO-process. In this manner, the mini-AO-plant can be controlled and monitored by qualified AO-process operators, thus assuring a smooth and reliable supply of hydrogen peroxide at the location where the hydrogen peroxide is needed. The communication network through which the first and second computer(s) are linked can for instance be the Internet. Alternatively, the communication network can be an extranet or an intranet.

Said sensors on said units (i.e., the hydrogenator, the oxidizer and the extractor) or said other means (i.e., the further equipment and means as mentioned above) are part of a monitoring system conventionally used in the art for monitoring the performance of a hydrogen peroxide manufacturing plant which runs under the AO-process. A suitable monitoring system, for instance, are preferably equipped with at least one measurement equipment to monitor the performance of the hydrogen peroxide production steps (a), (b) and/or (c). Usually, in performing and monitoring the mini-AO-process according to the invention the focus will be the monitoring of the hydrogenation and/or oxidation steps, which are the critical process step in the manufacture of hydrogen peroxide according to the invention, particularly with regard to the working solution productivity, whereas the extraction step is less critical in this regard. For example, but without limitation thereto, the working solution productivity is an important parameter to be monitored and controlled, and it will determine e.g., the flow rate of the working solution and other parameters depending on the production dimension (capacity) of the mini-AO-process or plant, having a maximum capacity of up to 20,000 metric tons per year, e.g., between 2,000 to 20,000 metric tons of hydrogen peroxide per year, preferably between 2,000 to 15,000 metric tons of hydrogen peroxide per year, and more preferably between 2,000 to 10,000 metric tons hydrogen peroxide per year, and particularly between 2,000 to 5,000 metric tons hydrogen peroxide per year. In general, productivity is defined as quantity of hydrogen peroxide produced with given quantity of working solution (ws) and expressed in grams (g) of hydrogen peroxide ($H_2O_2$) per kilogram (kg) of working solution. For example, state-of-the-art autoxidation processes run with productivities of about 7-15 g $H_2O_2$/kg of WS. Thus, the working solution productivity in the mini-AO-process is also measured as the amount by weight (g) of hydrogen peroxide ($H_2O_2$) per amount by weight (kg) of the working solution. As an example, but without limitation, the mini-AO-process may be run with a lower productivity than the state-of-the-art productivity in a large or mega-scale plant; e.g., such productivity may be 5 g $H_2O_2$/kg WS. In another example, in a mini-AO-process or plant with a production scale of 1 ktpa the productivity must yield in the production of about 140 kg $H_2O_2$ per hour. The equipment and/or means for the measurement of the productivity and the flow rate of the working solution calculated therefrom are preferably also interconnected to said first computer(s) and subsequently linked via a communication network to said second computer(s) in the remote control room.

The computer-controlled mini-AO-plant for carrying out the process according to the present invention preferably is a small- to medium-scale plant having a maximum capacity of between 2,000 to 10,000 metric tons of hydrogen peroxide per year. Said mini-AO-plant preferably is as compact as possible. It is noted that the mini-AO-plant according to the present invention most preferably does not comprise a unit for reversion (regeneration) of the working solution or a unit the reactivation of the reactivation catalyst, respectively, but are equipped with one or more sensors for monitoring one or more process parameters such as mentioned above. Said sensors are interconnected with one or more first computers, and said first computers are linked to one or more second computers in a control room via a communication network, with said control room being remote from the assembly of the hydrogenation, oxidation and extraction unit. The computer-controlled mini-AO-plant for carrying out the process according to the present invention has the advantage that it is compact, since a couple of process steps which are performed in conventional AO-processes have been eliminated or are now performed in simpler equipment, or are now performed in a more economically and technically feasible manner remotely in a distant large to mega-scale mother plant which provides optimized facilities and skilled staff, and from where also the process parameters shall be remotely controlled. In a preferred embodiment of the invention, said distant large to mega-scale mother plant shall provide central reversion unit and process for the periodical regeneration of the working solution and/or facilities for the periodical reactivation of the hydrogenation catalyst of the satellite mini-AO plant.

Thus, in a variant the invention also pertains to a computer-controlled device for carrying out the remote control process for the manufacture of hydrogen peroxide by the AO-process as described above, which device comprises a reactor system for carrying out a process for the manufacture of hydrogen peroxide by the AO-process, wherein said reactor system contains a working solution of at least one alkylanthraquinone dissolved in at least one organic solvent, said at least one alkylanthraquinone being capable to be hydrogenated to at least one corresponding alkylanthrahydroquinone compound, and said at least one alkylanthrahydroquinone compound being capable to be oxidized to obtain hydrogen peroxide and to revert back into the at least alkylanthraquinone, characterized in that the reactor system is designed as a compact and almost completely closed modular reactor system of a hydrogenation unit containing a hydrogenation catalyst, an oxidation unit and an extraction unit, and further characterized in that said reactor system (mini-AO-plant) is devoid of a regeneration unit for continuous and/or periodical cyclic reversion of the working solution, and wherein the reactor system is configured to operate without a such a regeneration or reversion unit as a small to medium scale AO-process reactor system with a production capacity of hydrogen peroxide of up to 20 kilo tons per year, preferably with a production capacity of hydrogen peroxide of up to 15 kilo tons per year, and more preferably with a production capacity of hydrogen peroxide of up to 10 kilo tons per year.

Thus, in a first embodiment of this variant of the computer-controlled device for carrying out the remote control process for the manufacture of hydrogen peroxide by the AO-process as described above, the invention pertains to a computer-controlled device as described before, wherein the reactor system contains a working solution of at least one alkylanthraquinone dissolved in at least one organic solvent, said at least one alkylanthraquinone being capable to be hydrogenated to at least one corresponding alkylanthrahydroquinone compound, and said at least one alkylanthrahydroquinone compound being capable to be oxidized to obtain hydrogen peroxide and to revert back into the at least alkylanthraquinone, characterized in that the reactor system is designed as a compact and almost completely closed modular reactor system of a hydrogenation unit containing a hydrogenation catalyst, an oxidation unit and an extraction unit, and further characterized in that said reactor system (mini-AO-plant) is devoid of a regeneration unit for continuous and/or periodical cyclic reversion of the working solution, and wherein the reactor system is configured to operate without a such a regeneration or reversion unit as a small to medium scale AO-process reactor system with a production capacity of hydrogen peroxide of up to 20 kilo tons per year, preferably with a production capacity of hydrogen peroxide of up to 15 kilo tons per year, and more preferably with a production capacity of hydrogen peroxide of up to 10 kilo tons per year.

And, in a second embodiment of this variant of the computer-controlled device for carrying out the remote control process for the manufacture of hydrogen peroxide by the AO-process as described above, the invention pertains to a computer-controlled device as described before, wherein the reactor system is configured to operate without a such a regeneration or reversion unit and wherein the working solution and/or the catalyst are replaced and/or treated for regeneration or reactivation only intermittently with a low frequency, preferably wherein the working solution and/or the catalyst are replaced and/or treated for regeneration or reactivation only periodically after periods of at least 3 months in the loop of the AO-process steps (a), (b) and (c).

Surprisingly, it has been found that the objective of a small to medium scale AO-process for the remotely controlled production of hydrogen peroxide can be very well realized in practice when in addition to down-scaling the process capacity and production facilities, the small to medium scale AO-process for the production of hydrogen peroxide is also simplified and performed in an almost completely closed and modular reactor system of a hydrogenation, an oxidation and an extraction unit and operated without a reversion (regeneration) unit, such that the working solution and/or the catalyst are only intermittently with low frequency or periodically with low frequency replaced for regeneration or reactivation after periods of several months operation, and the hydrogen peroxide extraction is carried out with such an amount of water so as to result in an aqueous hydrogen peroxide solution containing a predetermined concentration of hydrogen peroxide which is suitable to be directly utilized in a specified industrial application. Advantageously, this simplified small to medium scale AO-process for the production of hydrogen peroxide is suitable to be operated by remote control from a different site than the small to medium scale hydrogen peroxide production site, e.g., optionally as a decentralized or satellite production site, for instance at a hydrogen peroxide using customer or end-user production site, which is remotely controlled by a large-scale or mother hydrogen peroxide production plant and its qualified staff.

Accordingly, in this embodiment the present invention relates to a remotely controlled process for the manufacture of hydrogen peroxide by the AO-process comprising the two alternate (essential) steps of
(a) hydrogenation of a working solution in a hydrogenation unit (hydrogenator) in the presence of a catalyst, wherein said working solution contains at least one alkylanthraquinone dissolved in at least one organic solvent, to obtain at least one corresponding alkylanthrahydroquinone compound; and
(b) oxidation of said at least one alkylanthrahydroquinone compound to obtain hydrogen peroxide in an oxidation unit;
and further comprising the step of
(c) extracting the hydrogen peroxide formed in the oxidation step in an extraction unit, characterized in that the hydrogenation, oxidation and extraction steps are performed in an almost completely closed reactor system which is designed as a compact modular system of a hydrogenation, an oxidation and an extraction unit, and wherein said reactor system is configured to operate without a reversion (regeneration) unit as a small to medium scale AO-process with a production capacity of hydrogen peroxide of up to 20 kilo tons per year, preferably with a production capacity of hydrogen peroxide of up to 15 kilo tons per year, and more preferably with a production capacity of hydrogen peroxide of up to 10 kilo tons per year, wherein the working solution and/or the catalyst are replaced and/or treated for regeneration or reactivation only intermittently with a low frequency.

Accordingly, in a further embodiment the present invention relates to a remotely controlled process for the manufacture of hydrogen peroxide by the AO-process comprising the two alternate (essential) steps of
(a) hydrogenation of a working solution in a hydrogenation unit (hydrogenator) in the presence of a catalyst, wherein said working solution contains at least one alkylanthraquinone dissolved in at least one organic solvent, to obtain at least one corresponding alkylanthrahydroquinone compound; and
(b) oxidation of said at least one alkylanthrahydroquinone compound to obtain hydrogen peroxide in an oxidation unit; and further comprising the step of
(c) extracting the hydrogen peroxide formed in the oxidation step in an extraction unit,
and wherein the hydrogenation, oxidation and extraction steps are performed in an almost completely closed reactor system which is designed as a compact modular system of a hydrogenation, an oxidation and an extraction unit, and wherein said reactor system is configured to operate without a reversion (regeneration) unit as a small to medium scale AO-process, and wherein the working solution and/or the catalyst are replaced and/or treated for regeneration or reactivation only periodically after periods of at least 3 months in the loop of the AO-process steps (a), (b) and (c).

These embodiments of the invention of a remotely controlled "mini-AO-process" without a reversion (regeneration) unit, may be operated with a maximum production capacity of up to 20 ktpa, preferably maximum production capacity of up to 15 ktpa (kilo tons per annum), or it can be particularly operated with a capacity in the range of 2 to 15 ktpa (metric kilo tons per annum), preferably within a range of 2 to 10 ktpa, particularly within a range of 2 to 5 ktpa, or within any of the capacity ranges given further above. Similarly, the size of a plant for the manufacture of hydrogen peroxide depending on the production capacity is, for example, within the same design ranges as described already above, as for instance, 2-3 ktpa, 2-5 ktpa, 3-5 ktpa, 5-7.5 ktpa or 7.5-10 ktpa; or for higher capacities within the capacity ranges of 10-12.5 ktpa or 12.5-15 ktpa.

According to a first embodiment of the invention a mini-AO-process for the manufacture of hydrogen peroxide is provided which is automated to such an extent that it can be operated such that very little attention and support is required, in particular with regard to the reversion of the working solution and/or the regeneration of the hydrogenation catalyst. According to this embodiment of the invention the mini-AO-process for the manufacture of hydrogen peroxide is performed such that the working solution and/or the catalyst are only intermittently or periodically with a low frequency replaced or treated for regeneration or reactivation. This aspect of the invention will be referred to in the following as low frequency reversion and/or regeneration. Thus, in contrast to the conventional processes for the industrial manufacture of hydrogen peroxide which comprise a permanent and continuous reversion of the working solution during the process, the process according to the invention is simplified in that during the process the working solution needs to be reversed and/or the catalyst needs to be regenerated only intermittently or periodically with low frequency, e.g., at a point in time when the production of a predefined quantity of hydrogen peroxide is reached, when the production efficiency drops below a predefined threshold value of a minimum required production efficiency, and/or when a the quantity of by-products exceeds a certain predefined quantity. Thus, in this variant of the invention the working solution is normally replaced, by a fresh working solution or by a refreshed working solution, e.g., a working solution withdrawn from the reactor system and treated for reversion before refilling the reactor with said refreshed working solution, only intermittently when the before mentioned event occurs.

According to another embodiment of the invention the mini-AO-process for the manufacture of hydrogen peroxide is performed such that the working solution and/or the catalyst are only intermittently or periodically replaced for regeneration or reactivation, e.g., usually the AO-process according to the invention may be operated for periods of several months without replacement of the working solution for regeneration (reversion) or reactivation of the catalyst. The periodical replacement of the working solution and the catalyst are each independent from each other, but may be reasonably also be replaced at the same time or at different times or after the same or different periods of operation. Thus, the reversion is only intermittently performed after a continuous operation period of the reactor system of units (a), (b) and (c) of at least 3 months, e.g., the working solution is normally replaced, by a fresh working solution or by a refreshed working solution, e.g., a working solution withdraw from the reactor system and treated for reversion before refilling the reactor with said refreshed working solution, only after periods of at least 3 months operation in the loop of the AO-process steps (a), (b) and (c). Depending on the type of working solution and/or catalyst, and the particular design and capacity of the mini-AO-plant, the mini-AO-process may be such robust that it may be operated even for periods of individually at least 4, 5, 6, 7, 8, 9, 10, 11 or 12 months without replacement of the working solution for regeneration (reversion) or reactivation of the catalyst.

Therefore, in preferred embodiments of the invention the reversion or replacement of the working solution is only intermittently performed after a continuous operation period of the reactor system of units (a), (b) and (c) for at least 6 months, more preferably for at least 9 month, and in most preferred embodiments of the invention for at least 12 months. Usually, in practice the continuous working period may be individually from 3-4 months, 3-5 months, 3-6 months, 3-7 months, 3-8 months, 3-9 months, 3-10 months, 3-11 months, 3-12 months; 4-5 months, 4-6 months, 4-7 months, 4-8 months, 4-9 months, 4-10 months, 4-11 months, 4-12 months; 5-6 months, 5-7 months, 5-8 months, 5-9 months, 5-10 months, 5-11 months, 5-12 months; 6-7 months, 6-8 months, 6-9 months, 6-10 months, 6-11 months, 6-12 months; 7-8 months, 7-9 months, 7-10 months, 7-11 months, 7-12 months; 8-9 months, 8-10 months, 8-11 months, 8-12 months; 9-10 months, 9-11 months, 9-12 months; 10-11 months, 10-12 months or 11-12 months.

A particular advantage of the mini-AO-process of the present invention is that the manufacture of hydrogen peroxide by this AO-process can be performed as a decentralized satellite plant of a central mother plant for the production of hydrogen peroxide, whereby this satellite plant may be located at any, even remote industrial or end user site with the only precondition that at this facility or satellite site hydrogen and other common utilities are readily available for the mini-AO-process. Thus, the mini-AO-process can be operated in a decentralized manner as a satellite process distant, even far distant from a central large-scale mother plant. Therefore, at the satellite plant no facilities or means are required to continuously and simultaneously regenerate (reverse) the working solution and/or to reactivate the hydrogenation catalyst during the AO-process. At the time, e.g., after the above mentioned periods of continuous operation of the mini-AO-process the working solution and/or the catalyst are withdrawn from the satellite plant and replaced by a fresh or reversed working solution, or the catalyst is replaced by a fresh or reactivated catalyst, respectively. The working solution and/or the catalyst withdrawn from the satellite plant then is transported to the central mother plant for the purpose of regeneration (reversion) or reactivation, respectively.

The intermittent and/or periodical reversion of the working solution and/or the regeneration of the hydrogenation catalyst may be performed in various manners. For instance, normally the working solution and/or the catalyst are removed together at the same time from the mini-AO reactor system or they are removed separately at different times, as appropriate according to the process parameters and the process efficiency related to either the working solution or the hydrogenation catalyst.

The working solution is then regenerated in separate equipment for the reversion of the working compounds contained in the working solution. This reversion of the working solution may be performed, for instance, at a different site in the equipment of another hydrogen peroxide production plant, e.g., in the respective regeneration equipment of a similar or preferably a larger scale hydrogen peroxide production plant. Alternatively, the working solution may be regenerated in separate mobile regeneration equipment for the reversion of the working compounds contained in the working solution, e.g., in a mobile regeneration unit that is used on demand or as appropriate in a number of different locations where a small to medium hydrogen peroxide manufacturing process according to the AO-process is performed. Another option is to intermittently or periodically perform the regeneration of the working solution under particular conditions in the main equipment of the small to medium hydrogen peroxide manufacturing process according to the AO-process itself.

Similarly, as described above for the reversion of the working solution, the hydrogenation catalyst may be regenerated at a different site in the equipment of another similar scale or preferably a larger scale hydrogen peroxide production plant. Or, the hydrogenation catalyst may be regenerated in separate mobile regeneration equipment, e.g., in a mobile catalyst regeneration unit that is used on demand or as appropriate in a number of different locations where a small to medium hydrogen peroxide manufacturing process according to the AO-process is performed. Another option is to intermittently or periodically perform the regeneration of hydrogenation catalyst under particular conditions in the main equipment of the small to medium hydrogen peroxide manufacturing process according to the AO-process itself.

Therefore, the invention has the advantage that a substantially simplified process is run at the satellite plant, whereas the complicated reversion/regeneration of the satellite process WS is intermittently performed from time to time in the central mother plant, where all facilities and means, as well as competent and trained staff is available, and the reversion/regeneration therefore can be performed in a safe and more economic manner than compared to running an individual continuous reversion/regeneration of the working solution at each of a plurality of mini-plants.

Advantageously, the objective of the invention of a simplified and end-user friendly remotely controlled, in particular a remotely controlled small to medium scale process, is realized when use is made of a reactor system for the manufacture of hydrogen peroxide according to the AO-process which is devoid of a regeneration unit for continuous and/or periodical cyclic reversion of the working solution. The present invention therefore also pertains to a reactor system for carrying out a remotely controlled process for the manufacture of hydrogen peroxide by the AO-process, wherein said reactor system contains a working solution of at least one alkylanthraquinone dissolved in at least one organic solvent, said at least one alkylanthraquinone being capable to be hydrogenated to at least one corresponding alkylanthrahydroquinone compound, and said at least one alkylanthrahydroquinone compound being capable to be oxidized to obtain hydrogen peroxide and to revert back into the at least alkylanthraquinone, characterized in that the reactor system is designed as a compact and almost completely closed modular reactor system of a hydrogenation unit containing a hydrogenation catalyst, an oxidation unit and an extraction unit, and further characterized in that said reactor system (mini-AO-plant) is devoid of a regeneration unit for continuous and/or periodical cyclic reversion of the working solution, and wherein the reactor system is configured to operate without a such a regeneration or reversion unit as a small to medium scale AO-process reactor system with a production capacity of hydrogen peroxide of up to 20 kilo tons per year, preferably with a production capacity of hydrogen peroxide of up to 15 kilo tons per year, and more preferably with a production capacity of hydrogen peroxide of up to 10 kilo tons per year, and further characterized in that one or more of said units being equipped with one or more sensors for monitoring one or more AO-process parameters at the hydrogen peroxide production site, said sensors being interconnected with one or more first computers at the hydrogen peroxide production site, said first computers being linked via a communication network to one or more second computers in a control room being remote from the hydrogen peroxide production site, and wherein said control room is remotely controlling said hydrogen peroxide production site.

This remotely controlled mini-AO-plant, e.g., a remotely controlled reactor system, according to the present invention is well suited for carrying out the process according to the invention for the manufacture of hydrogen peroxide in small to medium production scale as described above. As said, the mini-AO-plant or reactor system comprises at least a hydrogenation unit (hydrogenator), an oxidation unit (oxidizer), and an extraction unit (extractor), and may further comprise as needed and appropriately assembled and communicating for the purpose of manufacture of hydrogen peroxide according to the AO-process, one or several equipment selected from pumping systems, valves, pipes, vessels, compressors, heating and cooling system, outlets, means for providing power and means for measuring the pressure, temperature, flow rate, density, viscosity, catalyst activity, acidity, purity, concentration, hydrogen peroxide productivity or other process parameters relevant for the production of hydrogen peroxide according to the AO-process, and being equipped with one or more sensors for monitoring one or more AO-process parameters, but wherein said mini-AO-plant or reactor system is characterized in that it is devoid of a regeneration unit for cyclic and continuous reversion of the working solution.

Said remotely controlled mini-AO-plant preferably is as compact as possible. It is noted that the remotely controlled mini-AO-plant according to the present invention preferably does not comprise a unit for reversion (regeneration) of the working solution or a unit for the reactivation of the reactivation catalyst, respectively, because according to the invention the reversion of the working solution and/or regeneration of the hydrogenation catalyst is not part of the preferred remotely controlled continuous small to medium scale manufacture of hydrogen peroxide. Thus, for instance, according to the inventive remotely controlled mini-AO-concept, the reversion is not performed in the conventional manner, but only intermittently as described above or periodically, e.g., after operating the working solution for periods of several months, as described herein, at a different site, e.g., similar scale or preferably a larger scale hydrogen peroxide production plant. Alternatively, the working solution is treated in a mobile reversion unit transported on-site, or in a further alternative it is treated in-situ under special conditions in the mini-AO reactor system itself without being withdrawn from the mini-AO reactor system.

This computer-controlled mini-AO-plant for carrying out the process according to the present invention in the embodiments which are devoid of a regeneration unit for continuous and/or periodical cyclic reversion of the working solution has the advantage that it is compact, since a couple of process steps which are performed in conventional AO-processes have been eliminated or are now performed in simpler equipment, or process steps like the reversion of the working solution are now performed in a more economically and technically feasible manner remotely and only intermittently or periodically and separately from the main hydrogen peroxide production steps, usually in a mobile reversion unit or in a distant large to mega-scale mother plant, whereby optimized facilities and operation by skilled staff is easily provided to a multitude of decentralized mini-AO-plants which may be located at e.g., a customer or end-user site, and from where also the process parameters shall be remotely controlled. Thus, in a preferred embodiment of the invention, said distant large to mega-scale mother plant shall provide a central reversion unit and process for the intermittent or periodical regeneration of the working solution and/or facilities for the intermittent or periodical reactivation of the hydrogenation catalyst of the satellite mini-AO plant.

Generally, in carrying out the present invention a working solution containing an anthraquinone working compound is dissolved in a suitable organic solvent. Working compounds that can be used in the process of the invention are those anthraquinones, in particular alkylanthraquinones, and mixtures thereof conventionally used for the manufacture of hydrogen peroxide by the AO-process.

Suitable anthraquinones are 2-alkylanthraquinones and include for example 2 ethylanthraquinone, 2-isopropylanthraquinone, 2-n-butylanthraquinone, 2-sec butylanthraquinone, 2-tert-butylanthraquinone, 2-amylanthraquinone, 2-sec amylanthraquinone, 2-tert-amylanthraquinone or mixtures thereof. Although the hydrogen peroxide AO-process is normally possible also with 2-alkyl-5,6,7,8-tetrahydroanthraquinones and their mixtures, the concentrations of these tetrahydroanthraquinones are minimized in the process according to the present invention. The organic solvents that can be used in the process of the invention are those solvents and mixtures thereof conventionally used in the manufacture of hydrogen peroxide by the AO-process. In particular, solvent mixtures of two or more solvents are used which are equally suitable for the different dissolution properties of quinones. Thus, usually mixtures of nonpolar aromatic solvents (quinone solvents) and polar solvents (hydroquinone solvents) are used in the manufacture of hydrogen peroxide by the AO-process.

Examples of suitable aromatic solvents include alkyl-substituted aromatics, particularly C 8 and C 12 alkyl benzenes or mixtures thereof. Examples of suitable polar solvents include higher alcohols (e.g. diisobutylcarbinol or 2-octanol), alkylated and arylated urea, phosphoric acid esters (e.g. trioctyl phosphate), 2-pyrrolidone, 2-methylcyclohexyl acetate or mixtures thereof. Examples of suitable solvent mixtures include mixtures of C 10 alkyl aromatics with diisobutylcarbinol or with 2-methylcyclohexyl acetate. Generally the working solution contains from 2 to 40% by wt of the anthraquinone or the mixture thereof.

As a matter of example, but without limitation a preferred working solution used in the process for the manufacture of hydrogen peroxide by the AO-process according to the invention may be a AQ/SX/S-150 composition, wherein AQ means a 2-alkylanthraquinone or a mixture thereof. A suitable 2-alkylanthraquinone may be a 2-amylanthraquinone or a mixture thereof, for instance, a mixture of tertiary amyl substituted anthraquinone and the secondary amyl substituted anthraquinone), SX means sextate or 2-methylcyclohexyl acetate (CAS no. 57 26-19-2) which is a commercially available industrial solvent; and S-150 means a commercially available aromatic hydrocarbon solvent of type 150 from the Solvesso® series. S-150 (Solvesso®-150; CAS no. 64742-94-5) is known as an aromatic solvent of high aromatics which offer high solvency and controlled evaporation characteristics that make them excellent for use in many industrial applications and in particular as process fluids. The Solvesso® aromatic hydrocarbons are available in three boiling ranges with varying volatility, e.g., with a distillation range of 165-181° C., of 182-207° C. or 232-295° C. They may be obtained also naphthalene reduced or as ultra-low naphthalene grades. Solvesso® 150 (S-150) is characterized as follows: distillation range of 182-207° C.; flash point of 64° C.; aromatic content of greater than 99% by wt; aniline point of 15° C.; density of 0.900 at 15° C.; and an evaporation rate (nButAc=100) of 5.3. Advantageously the preferred working solution is suitability for a wide range of production scales, ranging from small over medium to finally large- and mega-scale hydrogen peroxide production processes, which renders compatibility with small to mega plants. It also allows for a novel concept of changing the working solution only periodically after longer term of cycles over several months, e.g., even up to replacing the working solution in the mini-AO-process only once a year. Thus, in the process of the invention no continuous simultaneous reversion, and consequently no reversion unit is required in the mini-AO-plant. Therefore, the invention provides for the first time a reversion-unit-free process for the manufacture of hydrogen peroxide according to the AO-process. Currently there is no such system in the world without reversion, and usually a continuous on-site and in-use reversion unit is in place in the current state-of-the-art hydrogen peroxide production facilities as.

Therefore; the novel mini-AO process allows for only intermittent regeneration of the working solution, which is performed in a central reversion unit of large-scale "mother" plant where the process chemistry, effluent handling, competencies and facilities are readily available.

Acidity Control Working Solution: Although, the mini-AO-process according to the invention is performed without any simultaneous regeneration (reversion) unit, optionally the process may comprise an acidity control of the working solution. Thus, the mini-AO-plant may comprise facilities or means suited to measure the acidity of the working solution and further facilities or means suited for adapting and/or maintaining the acidity within predetermined ranges for running a continuous mini-AO-process without any simultaneous regeneration (reversion) of the working solution. Thus, instead of a reversion unit, optionally the mini-AO-process may foresee being equipped with a small unit, e.g., with an alumina bed, for acidity control of the working solution. The acidity control may be performed, as an example but without limitation, by e.g., inorganic oxides or e.g., carbonates.

The hydrogenation step may be performed in a conventional manner with a typical hydrogenation catalyst suited for a process for the manufacture of hydrogen peroxide by the Riedel-Pfleiderer AO-process and its variants. Typical hydrogenating catalysts known for the anthraquinone cyclic process can be used as catalysts in the hydrogenation stage, for instance, such as noble metal catalysts containing one or more noble metals from the series Pd, Pt, Ir, Rh and Ru. The catalysts known for the anthraquinone cyclic process can be in the form of fixed-bed catalysts or in the form of suspended catalysts, suspended catalysts being able to be used both in the form of an unsupported catalyst, e.g. palladium black or Raney nickel, and in the form of a supported suspended catalyst. While other catalytic metals may be used, for the purpose of the invention it was found that hydrogenation catalyst shall preferably comprise palladium (Pd) as the catalytic metal, preferable in combination with silver (Ag), and that such catalysts shall be used in the hydrogenation step. Palladium and palladium/silver catalysts are known to the ordinary skilled artisan, and Pd as well as Pd/Ag-catalysts optimized for the AO-process are described in the state of the art. As an example for a typical Pd/Ag hydrogenation catalyst composition reference is made to WO 98/15350 (Solvay Interox) which describes a PD/Ag catalyst composition of 0.5-2.5% by wt. Pd and 0.5-2.5% by wt. Ag, and which is used in a process for the manufacture of hydrogen peroxide by the anthraquinone process.

The hydrogenator may be operated with a fixed-bed catalyst of a Pd/Ag combination as the catalytic metal. In an alternative variant of the invention the hydrogenator may also be operated with a slurry catalyst. The fixed-bed catalyst usually consists of a packing of solid hydrogenation catalyst particles. It is generally desirable that the average diameter of these particles should be in the range of from about 0.2 to 10 mm. In a preferred embodiment of the process according to the invention the catalyst granules in the fixed bed have an average particle diameter of from 1 to 5 mm. Preferably, the catalyst of a Pd/Ag combination displays high initial selectivity and long-term stability outweighing the higher costs compared to a slurry catalyst. Productivities may be improved and/or costs (carrier/manufacture) may decreased by using lower particle sizes (e.g., 1-2 mm).

There are no special requirements concerning the shape of the catalyst particles and therefore the particles may be round, grains or even pellets of indeterminate shape. Generally the catalyst particles consist of a porous carrier such like aluminium oxide, titanium oxide, zirconium oxide, silica gel or activated carbon or organic polymers or mixtures of these oxides or mixtures of organic polymers, and of a catalytic metal, usually in the state-of-the-art such like rhodium, palladium, platinum or rhenium, which catalytic metal is deposited on or adsorbed to the surface of the carrier. The quantity of catalytic metal is advantageously below 10% of the total weight of the catalyst. As stated above in the present invention palladium is the preferred catalytic metal.

In the embodiments of the process according to the invention, the catalytic metal is deposited or absorbed on a typical hydrogenation catalyst carrier such as a silica carrier, an alumina carrier or a silica-alumina carrier. The use of an alumina carrier or a carrier substantially based on alumina for the catalytic metal used in mini-AO-processes is preferred, because an increased hydrogen peroxide specific production is observed when compared to the use of carriers made of silica alone. This is especially the case for a mini-AO-process according to the invention if using a foaming flow regime of the working solution in a trickle-bed hydrogenation reactor. But it is believed that a similar increase in hydrogen peroxide specific production may be observed when alumina carriers in other mini-AO-processes using a trickle-bed reactor, like a dispersed-bubble reactor for instance.

The hydrogenation step in the anthraquinone cyclic process can be performed continuously and conventional hydrogenation reactors can be used, such as e.g. stirred-tank reactors, tubular-flow reactors, fixed-bed reactors, loop reactors or air-lift pump reactors. Optionally, the reactors can be equipped with distribution devices, such as e.g. static mixers or injection nozzles, to distribute the hydrogen in the working solution. Hydrogenation is typically performed at a temperature in the range from 20 to 100° C., particularly preferably 45 to 75° C. The pressure is preferably in the range from 0.1 MPa to 1 MPa (absolute), particularly preferably 0.2 MPa to 0.5 MPa (absolute). The hydrogenation is typically performed in such a way that the hydrogen introduced into the hydrogenation reactor is in practical terms entirely consumed in the hydrogenation stage. The amount of hydrogen is preferably chosen so that between 30 and 80% of the total amount of reactant is converted from the quinone form into the hydroquinone form. Although in some of the AO-processes in the state of the art a mixture of alkyl anthraquinones and alkyl tetrahydroanthraquinones is used as the reactant, the present invention does not use such mixtures but only alkyl anthraquinones, and the amount of hydrogen is preferably chosen so that in the hydrogenation stage the alkyl anthraquinones are only converted into the hydroquinone form and no alkyl tetrahydroanthraquinones are formed.

The hydrogenating gas in the process according to the invention can be hydrogen or the hydrogen may be diluted in an inert gas. The term inert gas is intended to denote a gas which does not react with the working solution including the alkylanthraquinone, nor with the hydrogenation catalyst or the alkylhydroanthraquinone produced. Examples of these inert gases are in particular rare gases, carbon dioxide, fluorinated gases such as HFA and nitrogen. Nitrogen has given good results. The proportion of inert gas in the hydrogen containing gas mixture can vary in the range of from about 0.5 to 99% and preferably, in the range of from about 10 to 40%.

The presence of an inert gas is advantageous in view of the possibility to recirculate some gas. The recirculation of some gas may be desirable in order to guarantee a good and proper working of the pumping systems involved in the process for supplying the hydrogenating gas to the hydrogenation reactor. Furthermore, the use of an inert gas for the dilution of hydrogen may be advantageous for a variety of different flow regimes of the working solution. Thus, it is believed that inert gases may be advantageously used for the dilution of hydrogen in a trickle-bed hydrogenation reactor with a foaming working solution and also under other flow patterns, e.g. such like those already mentioned above: "trickling", "pulsing", "spray", "bubble" and "dispersed bubble". The temperature prevailing in the hydrogenation reactor will be regulated to optimize the selectivity and the productivity in relation to the hydrogenation of the working solution. The temperature will usually be in the range of from about 20° C. (ambient) to 100° C. In a preferred embodiment of the process according to the invention, the hydrogenation step is carried out at a temperature in the range of about 45 to 75° C. If a foaming working solution is used in the hydrogenation step of the process of the present invention, by the dilution of hydrogen with an inert gas (rare gas, nitrogen, carbon dioxide, fluorinated gas) the stability of the foam of the working solution and the hydrogen gas may be considerably improved, thus making it easier to control the hydrogenation, i.e., the feeding of working solution and the required amount of hydrogen, as well as the gas pressure. Thus, the risk of foam breakdown, while the foaming working solution is passing through the catalyst bed and concomitantly the hydrogen consumption is taking place, is minimized in the hydrogenation reactor. In addition, in the presence of an inert gas an enhanced stability of the catalytic activity is observed.

After the hydrogenation of the working compound dissolved in the in the working solution, the next process step of the two-stage mini-AO-process is the oxidation step. In the oxidation step, the hydrogenated working compounds, i.e., the alkylhydroanthraquinones, are oxidized using oxygen, air, oxygenated air, or a suitable oxygen containing compound in order to produce hydrogen peroxide and restore the working compound to its original form. The hydrogen peroxide produced in the oxidation step is then removed from the working solution, typically by extraction with water, and the remaining working solution containing the alkylanthraquinones in their original form is recycled to the hydrogenation step to again commence the process.

The oxidation may take place in a conventional manner as known for the AO-process. Typical oxidation reactors known for the anthraquinone cyclic process can be used for the oxidation. Bubble reactors, through which the oxygen-containing gas and the working solution are passed concurrently or counter-currently, are frequently used. The bubble reactors can be free from internal devices or preferably contain internal devices in the form of packing or sieve plates. Oxidation is can be performed at a temperature in the range from 30 to 70° C., particularly at 40 to 60° C. Oxidation is normally performed with an excess of oxygen, so that preferably over 90%, particularly over 95%, of the alkyl anthrahydroquinones contained in the working solution in hydroquinone form are converted to the quinone form.

For example, the oxidation may be performed in a mini channel reactor, but other forms of reactors e.g., such as CSTRs (continuous stirred tank reactor) may be applied, too. The mini channel reactor provides the advantage of being very compact, and of showing good performance, e.g., in terms of selectivity and productivity. Optionally, the mini channel reactor or other reactor types may have been subjected to protection measures against corrosion, before being place into the production and/or during the production. In view of the extraction step following the oxidation, water addition may be apparently beneficial in the mini-AO-process.

In the process for the manufacture of hydrogen peroxide by the AO-process according to the invention, the hydrogen peroxide is extracted with water from the oxidized working solution. The extraction step may be performed in a conventional manner as known for the processes for the manufacture of hydrogen peroxide by the Riedel-Pfleiderer AO-process and its variants. In the extraction stage of the process the oxidized working solution, which contains hydrogen peroxide in dissolved form, is extracted with an aqueous solution to produce an aqueous hydrogen peroxide solution and an extracted oxidized working solution, which in practical terms no longer contains any hydrogen peroxide. Deionized water, which optionally also contains additives for stabilizing hydrogen peroxide, for adjusting the pH and/or for corrosion protection, is preferably used as the extracting agent to extract the hydrogen peroxide. Extraction typically is performed in an extractor known per se, for instance, counter-currently in a continuous extraction column or preferably sieve-plate columns being used. In a preferred embodiment of the invention the extraction step is carried out with such an amount of water so as to result in an aqueous hydrogen peroxide solution containing a predetermined concentration of hydrogen peroxide which is suitable to be directly utilized in a specified industrial application.

According to the invention the extraction may take place subsequently to the oxidation in a separate extraction unit or optionally the extraction may start or be performed already during the oxidation step, if the oxidation step is performed in the presence of water added to the oxidation unit. The latter is referred to as "oxido-extraction" and may be, for instance, be performed as described in EP 0726227 (Kemira) or WO 2010/109011 (Solvay). Thus, the invention also relates to a process for the manufacture of hydrogen peroxide by the AO-process, wherein the extraction step is carried out at least partially already during the oxidation step by performing the oxidation step in the presence of water added to the oxidation unit.

For example, the EP 0726227 (Kemira) describes a hydrogen peroxide preparation by the anthraquinone process that involves oxidizing hydrogenated the organic working solution and extracting the hydrogen peroxide into aqueous solvent, in same vessel prior to recovery by phase separation. Thus, hydrogen peroxide is prepared by the anthraquinone process, in which the hydrogenated working solution, an oxygen-containing gas and an aqueous extraction solvent are fed into the same reaction zone to form a mixture of three phases and oxidation reaction occurs in the working solution to form hydrogen peroxide which transfers to the aqueous solution. Phase separation is then effected to recover the aqueous hydrogen peroxide. Also claimed is the use of the process in parallel with a conventional hydrogen peroxide process. When oxidation and extraction are carried out simultaneously in the same vessel, thereby the capital cost of a new plant may be reduced or the production from an existing plant may be increased.

As a further example, the WO 2010/109011 (Solvay) describes a process of forming hydrogen peroxide, which involves hydrogenating a working solution comprising a quinone, oxidizing the hydroquinone compound to obtain hydrogen peroxide, and separating hydrogen peroxide optionally during the oxidation. The working solution comprises organic solvent less than 30 wt. %, and the production of hydrogen peroxide by this process is useful in i.e., textile, pulp and paper bleaching, environmental and other applications. The method produces hydrogen peroxide without the use of substantial adjunction of organic solvent(s) which produces undesirable emissions and is notoriously hazardous due to the risk of explosion; and is cost-effective.

In the standard technology for the extraction of hydrogen peroxide a conventional sieve tray is used, and also applicable in the mini-AO-process according to the invention (reduced height). Alternatively, the hydrogen peroxide may be extracted by using a mini channel extractor, (serrated fin structure), or may also or additionally involve membrane technology. Optionally, again protection measures against corrosion are taken, e.g., by using stainless steel materials for design of the extractor. However, for the purpose of the invention the extraction is kept as simple and as compact as possible. Under the mini-AO process according to the invention the hydrogen peroxide is extracted from the working solution in low concentration, e.g., in the mini-AO-process according to the invention a hydrogen peroxide concentration of 10 to 15% is target, and the crude delivery of 10 to 15% hydrogen peroxide may be directly used in an industrial end user application like pulp and paper bleaching, textile bleaching, or paper recycling. The mini-AO-process of the invention does neither involve nor intend to involve any further concentration of the extracted hydrogen peroxide solution, and thus e.g., no distillation is required or applied, because for most applications hydrogen peroxide will be applied in a concentration of below 15%, In order to minimize operations, the dilution to the effective concentration normally occurs within the application itself by adding the appropriate amount of a higher concentrated solution of e.g., according to the present invention of crude delivery of usually 10 to 15% hydrogen peroxide. As explained above, hydrogen peroxide is used in various concentrations depending on the application, e.g., in a variety of applications hydrogen peroxide is used in a concentration of approximately 1-15 percent. Some particular examples of such hydrogen peroxide concentrations are, depending on the kind of industrial application: pulp bleaching 2-10%; waste water oxidation 1-5%; consumer products surface cleaning 1-8%.

In the process for the manufacture of hydrogen peroxide by the AO-process according to the invention, the hydrogen peroxide is extracted from the oxidized working solution with such an amount of water so as to result in an aqueous hydrogen peroxide solution containing a predetermined concentration of hydrogen peroxide which is suitable to be directly utilized in a specified industrial application. Thus, according to the process of the invention a crude hydrogen peroxide solution in a concentration ready for use in an industrial application is provided. The resulting crude hydrogen peroxide solution is readily suitable for its use at the host site, e.g., as bleaching agent in the pulp and paper industry or the textile industry host site, or in a site with mining and environmental applications. Thus, the hydrogen peroxide concentration in the aqueous solutions resulting from the extraction step according the invention can be specifically adjusted to the end user needs at the host (satellite) site, and the concentration may be in the range of up to 15 percent, preferably in the range of 2-15 percent, more preferably 5-15 percent, and most preferred in the range of 10-15 percent. Other suitable ranges of the crude hydrogen peroxide solution resulting from the mini-AO-process according to the invention may be from 2-5 percent, 2-6 percent, 2-7 percent, 2-8 percent, 2-9 percent, 2-10 percent, 2-11 percent, 2-12 percent, 2-13 percent, 2-14 percent, 2-15 percent; 3-6 percent, 3-7 percent, 3-8 percent, 3-9 percent, 3-10 percent, 3-11 percent, 3-12 percent, 3-13 percent, 3-14 percent, 3-15 percent; 4-6 percent, 4-7 percent, 4-8 percent, 4-9 percent, 4-10 percent, 4-11 percent, 4-12 percent, 4-13 percent, 4-14 percent, 4-15 percent; 5-6 percent, 5-7 percent, 5-8 percent, 5-9 percent, 5-10 percent, 5-11 percent, 5-12 percent, 5-13 percent, 5-14 percent, 5-15 percent; 6-7 percent, 6-8 percent, 6-9 percent, 6-10 percent, 6-11 percent, 6-12 percent, 6-13 percent, 6-14 percent, 6-15 percent; 7-8 percent, 7-9 percent, 7-10 percent, 7-11 percent, 7-12 percent, 7-13 percent, 7-14 percent, 7-15 percent; 8-9 percent, 8-10 percent, 8-11 percent, 8-12 percent, 8-13 percent, 8-14 percent, 8-15 percent; 9-10 percent, 9-11 percent, 9-12 percent, 9-13 percent, 9-14 percent, 9-15 percent; 10-11 percent, 10-12 percent, 10-13 percent, 10-14 percent, 10-15 percent; 11-12 percent, 11-13 percent, 11-14 percent, 11-15 percent; 12-13 percent, 12-14 percent, 12-15 percent; 13-14 percent, 13-15 percent, or 14-15 percent.

Next to the "essential" steps of the mini-AO-process according to the invention as described above, the process may also comprise a number of typical "ancillary" steps. (e.g., WS acidity control; hydrogen facility available at remote/satellite site). However, according to the concept of a simplified decentralized or remote satellite process at an end user site, the number of ancillary process step is kept as few as possible and usually is limited to the minimum need for continuously operating the mini-AO-process in the satellite plant as simple as possible but also as robust and stable over periods as indicated above without physical or too many technical interventions at the satellite plant during said periods.

Typically the synthesis loop of the conventional AO-process for producing hydrogen peroxide and peroxide processing stages are dependent on a number of ancillary processes. Thus, the mini-AO-process according to the present invention may also comprise ancillary processes, but the number and complexity of those ancillary processes is kept to a minimum. Ancillary processes in the context of present invention will pertain to the availability of hydrogen which is required for the hydrogenation step. Therefore, a hydrogen plant or hydrogen as a by-product of another process shall be available on-site of the mini-AO-process. There may be some laboratory with the purpose to provide information on the process performance and to carry out quality control testing of hydrogen peroxide. This information is used by operations personnel to control the loop in addition and in support of on-line instrumentation that is used to measure the synthesis loop operation at each stage of the process.

Another ancillary process is the regeneration of the working solution, but which is not part of the ancillary processes at the site of the mini-AO-process. Regeneration of the working solution is required periodically, because the: hydrogenation and oxidation steps generate not only peroxide-producing anthrahydroquinones but also some by-products. These by-products include anthraquinone species that can be converted back into useful quinones by regeneration. During the regeneration process in a conventional AO-process plant, a side stream of working solution is fed through a reversion and dehydrogenation unit. The regeneration converts epoxidized anthraquinones and tetrahydroanthraquinones to their corresponding anthraquinones, which is required in the conventional large-scale AO-processes before the working solution or only a part of the total working solution flow is re-circled into the hydrogenator. Reversion means conversion of certain by-product anthraquinone species, like epoxidised anthraquinones and tetrahydroanthraquinones, back into useful anthraquinones. However, according to the inventive mini-AO-concept, the reversion is not performed in the conventional manner, but only intermittently as described above or periodically, e.g., after operating the working solution for periods of several months as described herein. After such a period the working solution is either withdrawn from the mini-AO-process and regenerated at a different site, e.g., similar scale or preferably a larger scale hydrogen peroxide production plant, or treated in a mobile reversion unit transported on-site, or alternatively without being withdrawn from the mini-AO reactor system it is treated in-situ under special conditions in the mini-AO reactor system itself, and thereby the used working solution is replaced by fresh and/or regenerated one. If distance and transportation logistic economically allow, the actual reversion (regeneration) of the working solution withdrawn from the mini-AO-process is then performed in a reversion unit of a conventional large-scale plant for manufacturing hydrogen peroxide.

The described process according to the present invention has the advantages that it can deal adequately with specific needs of an end user with regard to the use of hydrogen peroxide solutions, e.g., the required amounts at given times of production, the concentration and quality thereof, in its own industrial processes, while at the same time the process according to the invention requires fewer process steps by focus on the essential main steps at the end user site, fewer pieces of equipment, less management attention, and less maintenance when compared with conventional large-scale hydrogen peroxide production processes. Thus, with the present invention, an efficient hydrogen peroxide production process is obtained which is economically feasible, even when performed on small to medium scale. Therefore, the present invention constitutes a considerable improvement over the known processes to produce hydrogen peroxide, and in particular aqueous hydrogen peroxide solutions readily suitable for the end users' industrial application.

The process according to the present invention has the further major advantage that it can be carried out using remote control, enabling management time and attention to be reduced considerably. Hence, the present process is preferably carried out using remote control. This remotely controlled process is suitable for being carried out on a small to medium scale. Hence, the process is typically performed in a small- to medium scale hydrogen peroxide plant having a maximum production capacity as described above for the mini-AO-process.

The present invention has a number of unique characteristics and advantages, regarding both aspects, the mini-AO-process and/or mini-AO-plant on the one hand, and the remote control of the mini-AO-process and/or mini-AO-plant on the other hand. Thus, the invention advantageously satisfies the demand for a small- to medium-scale production, e.g., for a mini-scale production, in the range of 2,000 to 10,000 metric tons hydrogen peroxide per year (mini-plants with 2 to 10 ktpa production capacity) at any, in particular also remote, site where hydrogen gas is available, e.g., from other production processes. Therefore, the invention may be performed close to or on a site of hydrogen peroxide customer, with the only precondition that hydrogen is available at that site, and the hydrogen is available onsite ideally as a sub-product and at low cost. With regard to the reversion of the working solution and/or the reactivation of the hydrogenation catalyst the mini-AO-process may be preferably performed in a "satellite" mini-AO-plant which is different and distant from a conventional large to mega scale hydrogen peroxide production site. But the mini-AO satellite plant will be related to such a large to mega scale hydrogen peroxide production site which operates as a mother plant in support of said satellite plant. The satellite mini-AO-plant is of compact design, e.g., it is preferably modular and the reactor and configurations are organized as almost completely closed system to provide a simple and robust mini-AO-process for the "satellite" plant. The satellite mini-AO-plant is operated by, at least partially by remote control and a small number of trained staff dedicated on-site (e.g., local operators) from and in close cooperation with a (even far) distant (large to mega scale) "mother" plant. Thereby, reliable process chemistry and its control, as well as the monitoring of related process parameters are assured in order to drive a stable and robust process without substantial by-product formation. Also, an important advantage of the present invention is the lack of a reversion unit in the satellite plant; e.g., the reversion or regeneration of the working solution is periodically required and may be performed at the "mother" plant, where the chemistry and process competencies are centralized or in a mobile reversion united operated by trained staff from the "mother" plant. Consequently, less laboratory personnel are required and the mini-AO-process, the reversion of the working solution and the reactivation of the catalyst may be run more economically. Thus, the invention provides a user friendly satellite plant, which is remotely controlled by the mother plant with minimum local intervention at the satellite plant over a certain period of time, as the process and plant of the invention is designed to produce hydrogen peroxide for direct use at the satellite or end user site. A particular advantage of the invention is that the mini-AO-process may be run with a catalyst and working solution combination to for as long as up to at least 12 months operation without physical and/or chemical intervention. For example no reversion of best performing working solution shall be required e.g., during average 3, 6, 9 or 12 months run cycles. The working solution and catalyst performance and management system preferably is based on Solvay technology as described in the introductory parts of this description of the invention, allowing the mini-AO-process being performed without formation of the non-desired tetra-by-product, and without installed reversion unit. Therefore, the catalyst and/or the working solution will be replaced only periodically. Another advantage is that the mini-AO-process and productivity is supported and remotely controlled from a mother plant to optimally maintain productivity by skilled personnel from that central plant, and that also the optimal catalyst reactivation and working solution regeneration is assured in said central mother plant or by mobile reversion united operated by trained staff from the "mother" plant.

Another advantage is that the mini-AO-process can be operated as an almost closed system. Therefore, no effluent system or treatment is required at the satellite plant, because main effluent from the AO-process is caused by and coming from the reversion or regeneration of the working solution. This is advantageous for the operation at customer site, because of the low environmental and technical impact when operating the mini-AO-process. However, a mother plant, e.g., a larger scale plant, is normally required for supporting the satellite plant, in particular in cases where a mobile reversion unit is not sufficient, said mother plant then provides a central reversion unit for environmentally friendly and periodical regeneration of the working solution of the mini-AO-plant. Nevertheless, this is outweighed by the fact that the working solution can be regenerated in the mother plant in a more efficient and the environment less impacting manner.

Furthermore, no distillation of hydrogen peroxide is required and the crude low concentration hydrogen peroxide is ready to be utilized in the customers' application, e.g., in pulp and paper bleaching, in the mining industry or paper recycling. This is an advantage of the production of hydrogen peroxide on-site of a hydrogen peroxide consuming end user (customer), because the mini-AO-process can avoid the distillation which is usually performed in the large-scale plants for converting the hydrogen peroxide into a more suitable concentrated form for transportation reasons. For example, the hydrogen peroxide concentration in conventional large-scale process is usually 40%, distilled to and transported with a concentration from 50 to 70%. Contrary, the target for the mini-AO-process according to the invention is a concentration of 10-15% hydrogen peroxide.

From a chemical process point of view the mini-AO process according to the present invention, and in particular the remote controlled mini-AO process, comprises the same main stages as a conventional large scale production process However, due to the down scaling and the simplification of the process made in view customer site friendly operation and remote control with substantially reduced local intervention, the process differs from the state of the art in that a local installed reversion unit for the regeneration of the working solution and means for the reactivation of the hydrogenation catalyst are missing and not required for longer production cycles of up to even 12 months.

The process directly produces hydrogen peroxide in concentrations required for its application by the customer, e.g., for bleaching in the pulp and paper industry or in the mining industry. Usually the required hydrogen peroxide concentration in those industrial applications is an up 15% solution of hydrogen peroxide in water. For example the concentration for those applications is typically in the range of 10 to 15% hydrogen peroxide solution. The concentration may be easily adapted to other low concentrated solution by simply regulating the amount of water which is used to extract the hydrogen peroxide from the oxidized working solution.

While the invention has been described with reference to details of the illustrated embodiment, these details are not intended to limit the scope of the invention as defined in the appended claims.

The invention claimed is:

1. A process for manufacturing hydrogen peroxide for use in an industrial end use application, comprising:
 (a) catalytically hydrogenating at least one alkylanthraquinone, wherein the at least one alkylanthraquinone is present in the form of a working solution comprising the at least one alkylanthraquinone dissolved in at least one organic solvent, to obtain at least one corresponding alkylanthrahydroquinone;
 (b) oxidizing the at least one alkylanthrahydroquinone to obtain :hydrogen peroxide;
 (c) extracting the hydrogen peroxide formed in step (b) of the process from the working solution with water to form an aqueous solution of hydrogen peroxide and recycling the working solution from step (b) of the process to step (a) of the process;
 (d) monitoring one or more process parameters of one or more of steps (a), (b), and (c) of the process; and (e) controlling one or more of steps (a), (b) and (c) of the process based on the one or more monitored process parameters, wherein:
the industrial end use application is located at a first site, steps (a), (b), and (c) of the process are performed at the first site in a reactor system having a production capacity of hydrogen peroxide of up to 20 kilo tons per year, steps (d) and (e) are performed remotely from a control site and the remote control site is different from and located at a distance from the first site, replacement of the working solution and the catalyst of steps (a), (b), and (c) is performed independently from each other and periodically, and steps (d) and (e) include the remote operational control of the AO-process chemistry.

2. The manufacturing process according to claim 1, wherein steps (a), (b), and (c) of the process are performed in a reactor system having a production capacity of hydrogen peroxide of from 2 to 15 kilo tons per year.

3. The manufacturing process according to claim 1, wherein the one or more process parameters comprise one or more process parameters selected from the group consisting of density, viscosity, catalyst activity, acidity, purity, concentration, and hydrogen peroxide productivity.

4. The manufacturing process according to claim 1, wherein steps (a) to (c) of the process are performed in a reactor system that is equipped with one or more sensors for monitoring one or more process parameters of the process.

5. The manufacturing process according to claim 1, wherein:
the replacement or regeneration of the working solution is performed in response to said one or more process parameters.

6. The manufacturing process according to claim 1, wherein said working solution is remotely operationally controlled to minimize formation and accumulation of non-active or potentially hazardous by-products of steps (a), (b), and (c) of the process.

7. The manufacturing process according to claim 6, wherein said working solution is remotely operationally controlled:
by means of a near infra-red (NIR) spectroscopy on-line analyzer, and/or
by means of a refractive index meter used for remotely operating and controlling the extraction of the hydrogen peroxide from the working solution in step (c) of the process.

8. The process of claim 1, wherein the aqueous hydrogen peroxide solution obtained from step (c) comprises from 1 to 15 percent by weight hydrogen peroxide.

9. The process of claim 1, wherein the extracting in step (c) is performed in an extraction column.

10. The process of claim 9, wherein the extracting in step (c) is performed counter-currently.

11. The process of claim 1, wherein the extracting in step (c) is performed counter-currently.

12. The process of claim 1, wherein the aqueous hydrogen peroxide solution obtained from step (b) contains a predetermined dilute concentration of hydrogen peroxide and is directly utilized in the industrial end use application.

13. The process of claim 1, wherein the one or more monitored process parameters are selected from the group consisting of catalytic activity, quality of the working solution, quality of the quinone working compounds, and byproduct formation.

14. The process of claim 1, wherein the replacement or regeneration of the working solution of steps (a), (b), and (c) is only performed after continuous operation for at least 6 months.

15. The process of claim 1, wherein reactivate of the catalyst of step (a) is only performed after continuous operation for at least 3 months.

16. The process of claim 15, wherein reactivation of the catalyst of step (a) is only performed after continuous operation for at least 6 months.

17. The process of claim 1, wherein regeneration of the working solution of steps (a), (h). and (c) is only performed after continuous operation for at least 3 months.

* * * * *